(12) United States Patent
Kato

(10) Patent No.: US 8,050,852 B2
(45) Date of Patent: Nov. 1, 2011

(54) ABNORMALITY DETECTION DEVICE FOR INTERNAL COMBUSTION ENGINE AND AIR/FUEL RATIO CONTROL APPARATUS FOR INTERNAL COMBUSTION ENGINE

(75) Inventor: Naoto Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 223 days.

(21) Appl. No.: 12/601,019

(22) PCT Filed: Jun. 10, 2008

(86) PCT No.: PCT/JP2008/060924
§ 371 (c)(1),
(2), (4) Date: Nov. 20, 2009

(87) PCT Pub. No.: WO2009/011191
PCT Pub. Date: Jan. 22, 2009

(65) Prior Publication Data
US 2010/0163008 A1     Jul. 1, 2010

(30) Foreign Application Priority Data

Jul. 19, 2007 (JP) .................................. 2007-188777

(51) Int. Cl.
*F02D 41/00* (2006.01)
(52) U.S. Cl. ........ 701/115; 701/109; 701/114; 701/103; 123/672; 123/674; 123/679; 123/688; 123/690; 123/704; 73/114.71; 73/114.72; 73/114.73; 73/114.75
(58) Field of Classification Search .................. 123/672, 123/673, 674, 679, 688, 690, 704, 437, 438; 701/102, 103, 104, 105, 106, 109, 115, 114
See application file for complete search history.

(56) References Cited

U.S. PATENT DOCUMENTS

| 4,974,563 | A |   | 12/1990 | Ikeda et al. |         |
|-----------|---|---|---------|--------------|---------|
| 5,964,208 | A | * | 10/1999 | Yamashita et al. | 123/674 |

(Continued)

FOREIGN PATENT DOCUMENTS

| EP | 0 345 524   | 12/1989 |
| EP | 0 549 566   | 6/1993  |
| EP | 1 074 718   | 2/2001  |
| EP | 1 729 001   | 12/2006 |
| JP | 3-54345 A   | 3/1991  |
| JP | 5 180059    | 7/1993  |
| JP | 8 232727    | 9/1996  |
| JP | 2003 97334  | 4/2003  |

(Continued)

OTHER PUBLICATIONS

Japanese Office Action mailed Sep. 28, 2010 in corresponding Japanese Application No. 2007-188777.

*Primary Examiner* — Stephen K Cronin
*Assistant Examiner* — Raza Najmuddin
(74) *Attorney, Agent, or Firm* — Oblon, Spivak, McClelland, Maier & Neustadt, L.L.P.

(57) ABSTRACT

An abnormality detection device for an internal combustion engine capable of performing abnormality detection with accuracy, and an air/fuel ratio control apparatus for an internal combustion engine capable of performing air/fuel ratio control with accuracy. An estimated value of the amount of intake air at a valve closing time at which an intake value is closed, is computed. The in-cylinder air/fuel ratio in a cylinder is computed by using the estimated value. The obtained in-cylinder air/fuel ratio is used as an input air/fuel ratio to identify a parameter in a primary delay element. Determination as to the existence/nonexistence of an abnormality in a pre-catalyst sensor (A/F sensor) is made on the basis of the obtained parameter.

6 Claims, 5 Drawing Sheets

U.S. PATENT DOCUMENTS

| | | | |
|---|---|---|---|
| 6,287,453 B1 * | 9/2001 | Rosel et al. | 205/783 |
| 7,720,595 B2 * | 5/2010 | Iwazaki | 701/114 |
| 2002/0107630 A1 | 8/2002 | Yagi | |
| 2003/0024514 A1 * | 2/2003 | Kitamura et al. | 123/672 |
| 2004/0040283 A1 * | 3/2004 | Yasui et al. | 60/276 |
| 2005/0216175 A1 * | 9/2005 | Takahashi et al. | 701/109 |
| 2006/0005821 A1 | 1/2006 | Osumi et al. | |
| 2006/0089731 A1 * | 4/2006 | Kawakatsu et al. | 700/46 |
| 2006/0271271 A1 | 11/2006 | Chauvin et al. | |

FOREIGN PATENT DOCUMENTS

| | | |
|---|---|---|
| JP | 2004 68602 | 3/2004 |
| JP | 2004 316457 | 11/2004 |
| JP | 2004 360591 | 12/2004 |
| JP | 2005 30358 | 2/2005 |
| JP | 2005-273591 A | 10/2005 |
| JP | 2006 118429 | 5/2006 |
| JP | 2006-291726 A | 10/2006 |
| JP | 2008 175202 | 7/2008 |

\* cited by examiner

↓ : A time at which estimated value kl is computed.
(computed per 8 milliseconds)

t_inj ☆ : A time at which the injection quantity for the present combustion process is computed.

t_ig ★ : A time at which ignition timing of the ignition plug is computed.

Exh : Exhaust stroke
Int : Intake stroke
Comp : Compression stroke
Exp : Expansion stroke

ABNORMALITY DETECTION DEVICE FOR INTERNAL COMBUSTION ENGINE AND AIR/FUEL RATIO CONTROL APPARATUS FOR INTERNAL COMBUSTION ENGINE

TECHNICAL FIELD

The present invention relates to an abnormality detection device for an internal combustion engine and to an air/fuel ratio control apparatus for an internal combustion engine.

BACKGROUND ART

A device for detecting an abnormality in an air/fuel ratio sensor (hereinafter also referred to as a "A/F sensor") by utilizing an output from the A/F sensor, for example, as disclosed in Japanese Patent Laid-Open No. 2005-30358, is known. According to this conventional art, an injection quantity, i.e. an amount of fuel from an injector, is changed by open-loop control and determination as to the existence/nonexistence of an abnormality in the A/F sensor is made by evaluating changes in the output from the A/F sensor resulting from changing the amount of duel injection.

Also, an air/fuel ratio control apparatus for internal combustion engines is known in which an output from an A/F sensor is fed back to an injection quantity, for example, as mentioned in Japanese Patent Laid-Open No. 2004-68602. According to this conventional art, a plant model representing a control system from a fuel injection valve to the A/F sensor is identified at successive times, and feedback control is performed by using the values of parameters identified in this model.

[Patent document 1] Japanese Patent Laid-Open No. 2005-30358
[Patent document 2] Japanese Patent Laid-Open No. 2004-68602
[Patent document 3] Japanese Patent Laid-Open No. 5-180059
[Patent document 4] Japanese Patent Laid-Open No. 8-232727
[Patent document 5] Japanese Patent Laid-Open No. 2006-118429
[Patent document 6] Japanese Patent Laid-Open No. 2003-97334
[Patent document 7] Japanese Patent Laid-Open No. 2004-316457
[Patent document 8] Japanese Patent Laid-Open No. 2004-360591

DISCLOSURE OF INVENTION

In each of the above-described conventional arts, the air/fuel ratio computed on the basis of the amount of intake air based on the air flow meter output and the injection quantity is used as input information for evaluation of characteristics of the A/F sensor or as input information for identification of parameters. (Such information will also be referred to generally as "input air/fuel ratio".) The input air/fuel ratio is used for detection of not only an abnormality in the A/F sensor but also abnormalities in a catalyst and a sub $O_2$ sensor.

However, there is a possibility of noncoincidence between the amount of intake air based on the output from the air flow meter and the actual amount of intake air in the cylinder or noncoincidence between the amount of fuel injected by the fuel injection valve (injector) and the actual amount of fuel in the cylinder. Due to this noncoincidence, there is a possibility of a difference between the input air/fuel ratio and the actual air/fuel ratio and, hence, a reduction in computation accuracy. There is still a scope for improvement in the conventional art in this respect.

The present invention has been achieved to solve the above-described problem, and an object of the present invention is to provide an abnormality detection device for an internal combustion engine capable of suitably setting the input air/fuel ratio according to the actual air/fuel ratio and performing abnormality detection with accuracy. Another object of the present invention is to provide an air/fuel ratio control apparatus for an internal combustion engine capable of suitably setting the input air/fuel ratio according to the actual air/fuel ratio and performing air/fuel ratio control with accuracy.

To achieve the above-mentioned purpose, a first aspect of the present invention is an abnormality detection device for an internal combustion engine, characterized by comprising:

output obtaining means of obtaining an output from an exhaust gas sensor provided in an internal combustion engine;

estimated value computation means of repeatedly computing estimated values of an amount of intake air in a predetermined cycle with respect to each of cylinders of the internal combustion engine;

time obtaining means of obtaining valve closing time at which an intake valve of one cylinder of the cylinders of the internal combustion engine is closed after an intake stroke in one combustion cycle with respect to the one cylinder of the internal combustion engine;

estimation means of performing estimation of the amount of intake air in the one cylinder at the valve closing time in present combustion cycle on the basis of following (a), (b), (c) and (d);

(a) at least one of estimated values computed before the valve closing time in the present combustion cycle in a plurality of estimated values computed by the estimated value computation means about the valve closing time in the present combustion cycle of the one cylinder, (b) at least one of the estimated values computed after the valve closing time in the present combustion cycle in a plurality of estimated values computed by the estimated value computation means about the valve closing time in the present combustion cycle of the one cylinder, (c) the time period from the time at which the at least one estimated value computed before the valve closing time in the present combustion cycle is computed to the valve closing time in the present combustion cycle, (d) the time period from the valve closing time in the present combustion cycle to the time at which the at least one estimated value computed after the valve closing time in the present combustion cycle is computed;

in-cylinder air/fuel ratio computation means of computing the air/fuel ratio of the one cylinder of the internal combustion engine on the basis of the estimated value of the amount of intake air obtained by the estimation means with respect to the one cylinder in the present combustion cycle and an amount of fuel supply to the one cylinder in the present combustion cycle; and abnormality determination means of determining the existence/nonexistence of an abnormality in the exhaust gas sensor on the basis of the output from the exhaust gas sensor obtained by the output obtaining means and the air/fuel ratio computed by the in-cylinder air/fuel ratio computation means.

To achieve the above-mentioned purpose, a second aspect of the present invention is an abnormality detection device for an internal combustion engine, characterized by comprising:

sensor output obtaining means of obtaining an output from an exhaust gas sensor provided in an internal combustion engine;

air flow output obtaining means of obtaining an output from an air flow meter provided in an intake air passage of the internal combustion engine;

air delivery amount detection means of detecting an amount of air delivered between the intake air passage and the outside of the intake air passage downstream of the air flow meter;

actual in-cylinder intake air amount computation means of computing the amount of intake air in one cylinder of the internal combustion engine on the basis of the output from the air flow meter obtained by the air flow output obtaining means and the amount of air obtained by the air delivery amount detection means;

in-cylinder air/fuel ratio computation means of computing the air/fuel ratio in the one cylinder on the basis of the amount of intake air obtained by the actual in-cylinder intake air amount computation means with respect to the one cylinder and an amount of fuel supply to the one cylinder; and abnormality determination means of determining the existence/nonexistence of an abnormality in the exhaust gas sensor on the basis of the output from the exhaust gas sensor obtained by the sensor output obtaining means and the air/fuel ratio computed by the in-cylinder air/fuel ratio computation means.

A third aspect of the present invention is the abnormality detection device for an internal combustion engine according to the first aspect or the second aspect, characterized in that the abnormality determination means includes:

identification means of forming a model of a system from the one cylinder to the exhaust gas sensor by a primary delay element and identifying a parameter in the primary delay element on the basis of the output from the exhaust gas sensor and the air/fuel ratio computed by the in-cylinder air/fuel ratio computation means; and parameter abnormality determination means of determining the existence/nonexistence of an abnormality in the exhaust gas sensor on the basis of the parameter identified by the identification means.

To achieve the above-mentioned purpose, a fourth aspect of the present invention is an abnormality detection device for an internal combustion engine, characterized by comprising:

output obtaining means of obtaining an output from an exhaust gas sensor provided downstream of a catalyst in an internal combustion engine;

estimated value computation means of repeatedly computing estimated values of an amount of intake air in a predetermined cycle with respect to each of cylinders of the internal combustion engine;

time obtaining means of obtaining valve closing time at which an intake valve of one of the cylinders of the internal combustion engine is closed after an intake stroke in one combustion cycle with respect to the one cylinder of the internal combustion engine;

estimation means of performing estimation of the amount of intake air in the one cylinder at the valve closing time in the present combustion cycle on the basis of following (a), (b), (c) and (d);

(a) at least one of estimated values computed before the valve closing time in the present combustion cycle in a plurality of estimated values computed by the estimated value computation means about the valve closing time in the present combustion cycle of the one cylinder, (b) at least one of the estimated values computed after the valve closing time in the present combustion cycle in a plurality of estimated values computed by the estimated value computation means about the valve closing time in the present combustion cycle of the one cylinder, (c) the time period from the time at which the at least one estimated value computed before the valve closing time in the present combustion cycle is computed to the valve closing time in the present combustion cycle, (d) the time period from the valve closing time in the present combustion cycle to the time at which the at least one estimated value computed after the valve closing time in the present combustion cycle is computed;

in-cylinder air/fuel ratio computation means of computing the air/fuel ratio of the one cylinder of the internal combustion engine on the basis of the estimated value of the amount of intake air obtained with respect to the one cylinder in the present combustion cycle by the estimation means and an amount of fuel supplied to the one cylinder in the present combustion cycle; and abnormality determination means of determining the existence/nonexistence of an abnormality in the catalyst on the basis of the output from the exhaust gas sensor obtained by the output obtaining means and the air/fuel ratio computed by the in-cylinder air/fuel ratio computation means.

To achieve the above-mentioned purpose, a fifth aspect of the present invention is an abnormality detection device for an internal combustion engine, characterized by comprising:

sensor output obtaining means of obtaining an output from an exhaust gas sensor provided downstream of a catalyst in an exhaust passage of an internal combustion engine;

air flow output obtaining means of obtaining an output from an air flow meter provided in an intake air passage of the internal combustion engine;

air delivery amount detection means of detecting an amount of air delivered between the intake air passage and the outside of the intake air passage downstream of the air flow meter;

actual in-cylinder intake air amount computation means of computing the amount of intake air in one cylinder of the internal combustion engine on the basis of the output from the air flow meter obtained by the air flow output obtaining means and the amount of air obtained by the air delivery amount detection means;

in-cylinder air/fuel ratio computation means of computing the air/fuel ratio in the one cylinder on the basis of the amount of intake air obtained by the actual in-cylinder intake air amount computation means with respect to the one cylinder and an amount of fuel supply to the one cylinder; and abnormality determination means of determining the existence/nonexistence of an abnormality in the catalyst on the basis of the output from the exhaust gas sensor obtained by the sensor output obtaining means and the air/fuel ratio computed by the in-cylinder air/fuel ratio computation means.

A sixth aspect of the present invention is the abnormality detection device for an internal combustion engine according to the fourth aspect or the fifth aspect, characterized in that the abnormality determination means includes:

identification means of forming a model of a system from the one cylinder to the exhaust gas sensor by a primary delay element and identifying a parameter in the primary delay element on the basis of the output from the exhaust gas sensor and the air/fuel ratio computed by the in-cylinder air/fuel ratio computation means; and parameter abnormality determination means of determining the existence/nonexistence of an abnormality in the catalyst on the basis of the parameter identified by the identification means.

A seventh aspect of the present invention is the abnormality detection device for an internal combustion engine according to the third aspect or the sixth aspect, characterized by further comprising:

identification restriction means of inhibiting identification by the identification means or reducing the rate of reflection of identification by the identification means when the internal combustion engine is in a predetermined operating condition in which the accuracy of the result of computation by the in-cylinder air/fuel ratio computation means is reduced.

A eighth aspect of the present invention is the abnormality detection device for an internal combustion engine according to any one of the first aspect to the seventh aspect, characterized by further comprising:

in-cylinder fuel amount computation means of computing the amount of fuel supply to the one cylinder on the basis of an amount of injection from a fuel injection valve of the internal combustion engine and an operating condition of the internal combustion engine.

To achieve the above-mentioned purpose, a ninth aspect of the present invention is an air/fuel ratio control apparatus for an internal combustion engine, characterized by comprising:

a catalyst disposed in an exhaust passage of an internal combustion engine;

an exhaust gas sensor disposed upstream of the catalyst;

feedback control means of feeding back an output from the exhaust gas sensor to an injection quantity so that the air/fuel ratio of exhaust gas flowing into the catalyst coincides with a target air/fuel ratio;

estimated value computation means of repeatedly computing estimated values of an amount of intake air in a predetermined cycle with respect to each of cylinders of the internal combustion engine;

time obtaining means of obtaining valve closing time at which an intake valve of one of the cylinders of the internal combustion engine is closed after an intake stroke in one combustion cycle with respect to the one cylinder of the internal combustion engine;

estimation means of performing estimation of the amount of intake air in the one cylinder at the valve closing time in the present combustion cycle on the basis of following (a), (b), (c) and (d);
  (a) at least one of estimated values computed before the valve closing time in the present combustion cycle in a plurality of estimated values computed by the estimated value computation means about the valve closing time in the present combustion cycle of the one cylinder,
  (b) at least one of the estimated values computed after the valve closing time in the present combustion cycle in a plurality of estimated values computed by the estimated value computation means about the valve closing time in the present combustion cycle of the one cylinder,
  (c) the time period from the time at which the at least one estimated value computed before the valve closing time in the present combustion cycle is computed to the valve closing time in the present combustion cycle,
  (d) the time period from the valve closing time in the present combustion cycle to the time at which the at least one estimated value computed after the valve closing time in the present combustion cycle is computed;

in-cylinder air/fuel ratio computation means of computing the air/fuel ratio of the one cylinder of the internal combustion engine on the basis of the estimated value of the amount of intake air obtained with respect to the one cylinder in the present combustion cycle by the estimation means and an amount of fuel supply to the one cylinder in the present combustion cycle;

identification means of forming a model of a system from the one cylinder to the exhaust gas sensor by a primary delay element and identifying a parameter in the primary delay element on the basis of the output from the exhaust gas sensor and the air/fuel ratio computed by the in-cylinder air/fuel ratio computation means; and setting means of setting an amount of feedback correction by the feedback control means by using the parameter identified by the identification means.

To achieve the above-mentioned purpose, a tenth aspect of the present invention is an air/fuel ratio control apparatus for an internal combustion engine, characterized by comprising:

a catalyst disposed in an exhaust passage of an internal combustion engine;

an exhaust gas sensor disposed upstream of the catalyst;

feedback control means of feeding back an output from the exhaust gas sensor to an injection quantity so that the air/fuel ratio of exhaust gas flowing into the catalyst coincides with a target air/fuel ratio;

an air flow meter disposed in an intake air passage of the internal combustion engine;

air delivery amount detection means of detecting an amount of air delivered between the intake air passage and the outside of the intake air passage downstream of the air flow meter;

actual in-cylinder intake air amount computation means of computing the amount of intake air in one cylinder of the internal combustion engine on the basis of the output from the air flow meter obtained by the air flow output obtaining means and the amount of air obtained by the air delivery amount detection means;

in-cylinder air/fuel ratio computation means of computing the air/fuel ratio in the one cylinder on the basis of the amount of intake air obtained by the actual in-cylinder intake air amount computation means with respect to the one cylinder and an amount of fuel supply to the one cylinder;

identification means of forming a model of a system from the one cylinder to the exhaust gas sensor by a primary delay element and identifying a parameter in the primary delay element on the basis of the output from the exhaust gas sensor and the air/fuel ratio computed by the in-cylinder air/fuel ratio computation means; and setting means of setting an amount of feedback correction by the feedback control means by using the parameter identified by the identification means.

A eleventh aspect of the present invention is the air/fuel ratio control apparatus for an internal combustion engine according to the ninth aspect or the tenth aspect, characterized by further comprising:

identification restriction means of inhibiting identification by the identification means or reducing the rate of reflection of identification by the identification means when the internal combustion engine is in a predetermined operating condition in which the accuracy of the result of computation by the in-cylinder air/fuel ratio computation means is reduced.

A twelfth aspect of the present invention is the air/fuel ratio control apparatus for an internal combustion engine according to any one of the ninth aspect to the eleventh aspect, characterized by further comprising:

in-cylinder fuel amount computation means of computing the amount of fuel supply to the one cylinder on the basis of an amount of injection from a fuel injection valve of the internal combustion engine and an operating condition of the internal combustion engine.

According to the first aspect of the present invention, an amount of intake air at the time of intake valve closing is estimated with high accuracy and abnormality in the exhaust gas sensor can be detected with high accuracy by utilizing the air/fuel ratio computed by the in-cylinder air/fuel ratio computation means using the estimated value.

According to the second aspect of the present invention, the actual amount of intake air in the cylinder can be computed with high accuracy by considering a change in the amount of air downstream of the air flow meter. As a result, an abnormality in the exhaust gas sensor can be detected with high accuracy by utilizing the computed value.

According to the third aspect of the present invention, the actual amount of intake air in the cylinder is obtained with high accuracy and parameters in the primary delay element can be identified with accuracy by using the value of the actual amount of intake air. In particular, in the third aspect of the present invention, if there is a difference between the amount of intake air based on the amount of fuel injection during intake valve opening and the amount of intake air determined when the intake valve is closed (that is, if there occurs an irregularities in air/fuel ratio), identification chances can be increased by utilizing this difference. Therefore, an improvement in accuracy of input information and an increase in the number of identification chances are simultaneously achieved to enable detection of an abnormality in the exhaust gas sensor with high accuracy based on the parameters identified with high accuracy.

According to the fourth aspect of the present invention, the amount of intake air at the time of intake valve closing is estimated with high accuracy and an abnormality in the catalyst can be detected with high accuracy by utilizing the air/fuel ratio computed by the in-cylinder air/fuel ratio computation means using the estimated value.

According to the fifth aspect of the present invention, the actual amount of intake air in the cylinder can be computed with high accuracy by considering a change in the amount of air downstream of the air flow meter. As a result, an abnormality in the catalyst can be detected with high accuracy by utilizing the computed value.

According to the sixth aspect of the present invention, the actual amount of intake air in the cylinder is obtained with high accuracy and parameters in the primary delay element can be identified with accuracy by using the value of the actual amount of intake air. In particular, in the sixth invention, if there is a difference between the amount of intake air based on the amount of fuel injection during intake valve opening and the amount of intake air determined when the intake valve is closed (that is, if there occurs an irregularities in air/fuel ratio), identification chances can be increased by utilizing this difference. Therefore, an improvement in accuracy of input information and an increase in the number of identification chances are simultaneously achieved to enable detection of an abnormality in the catalyst with high accuracy based on the parameters identified with high accuracy.

According to the seventh aspect of the present invention, the identification operation can be limited when the accuracy of the result of computation of the in-cylinder air/fuel ratio is low. Hence, the occurrence of identification with low accuracy of the input air/fuel ratio at an unsuitable time can be reduced.

According to the eighth aspect of the present invention, the actual amount of fuel in the cylinder when the intake valve is closed can be obtained with high accuracy, whereby the accuracy of computation of the in-cylinder air/fuel ratio can be improved.

According to the ninth aspect of the present invention, the amount of intake air at the time of intake valve closing is estimated with high accuracy and parameters in the primary delay element can be identified by utilizing the air/fuel ratio computed by the in-cylinder air/fuel ratio computation means using the estimated value. In particular, in the ninth aspect of the present invention, if there is a difference between the amount of intake air based on the amount of fuel injection during intake valve opening and the amount of intake air determined when the intake valve is closed (that is, if there occurs an irregularities in air/fuel ratio), identification chances can be increased by utilizing this difference. Therefore, an improvement in accuracy of input information and an increase in the number of identification chances are simultaneously achieved to enable air-fuel ratio feedback control based on the parameters identified with high accuracy.

According to the tenth aspect of the present invention, the actual amount of intake air in the cylinder can be computed with high accuracy by considering a change in the amount of air downstream of the air flow meter. Parameters in the primary delay element can be identified by utilizing the computed value. In particular, in the tenth aspect of the present invention, if there is a difference between the amount of intake air based on the amount of fuel injection during intake valve opening and the amount of intake air determined when the intake valve is closed (that is, if there occurs an irregularities in air/fuel ratio), identification chances can be increased by utilizing this difference. Therefore, an improvement in accuracy of input information and an increase in the number of identification chances are simultaneously achieved to enable air-fuel ratio feedback control based on the parameters identified with high accuracy.

According to the eleventh aspect of the present invention, the identification operation can be limited when the accuracy of the result of computation of the in-cylinder air/fuel ratio is low. Hence, the occurrence of identification with low accuracy of the input air/fuel ratio at an unsuitable time can be reduced.

According to the twelfth aspect of the present invention, the actual amount of fuel when the intake valve is closed can be obtained with high accuracy, whereby the accuracy of computation of the in-cylinder air/fuel ratio can be improved.

BEST MODE FOR CARRYING OUT THE INVENTION

First Embodiment

An abnormality detection device for an internal combustion engine according to a first embodiment of the present invention will be described below. In the first embodiment, an abnormality of an air/fuel ratio sensor (hereinafter also referred to as a "A/F sensor") is detected by using an A/F sensor response characteristic model expressed as a primary delay system. A feature of the first embodiment resides that, when this detection is performed, the amount of intake air when the intake valve is closed is estimated with high accuracy and values obtained by this estimation are used as input information for one-by-one identification of parameters of the response characteristic model.

[Construction of the First Embodiment]

Figure 1:
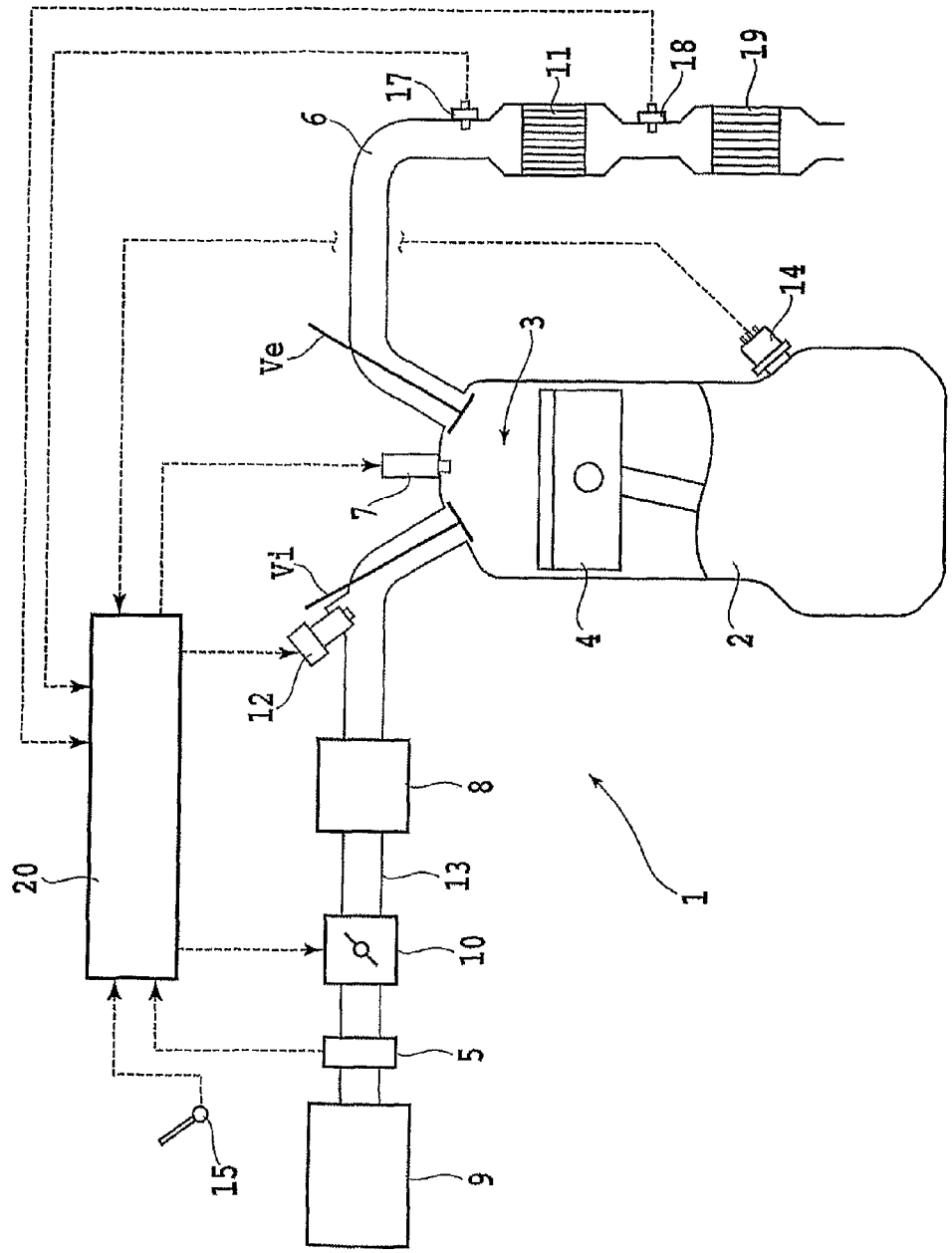
FIG. 1 is a diagram schematically showing an internal combustion engine according to a first embodiment of the present invention.

FIG. 1 is a diagram schematically showing an internal combustion engine according to the present embodiment. As illustrated, an internal combustion engine 1 causes combustion of a fuel-air mixture in a combustion chamber 3 in a cylinder 2 to reciprocate a piston 4 in the combustion chamber 3, thereby generating motive power. The internal combustion engine 1 in the present embodiment is a multicylinder vehicle engine (e.g., four-cylinder engine, whose only one cylinder is illustrated), a spark-ignition-type internal combustion engine, more specifically a gasoline engine.

In a cylinder head of the internal combustion engine 1, an intake valve Vi which opens/closes an intake port and an exhaust valve Ve which opens/closes an exhaust port are disposed on each of the cylinders. Each intake valve Vi and each exhaust valve Ve are opened/closed by a camshaft not illustrated. An ignition plug 7 for igniting the air-fuel mixture in the combustion chamber 3 is attached to a top portion of the cylinder head in correspondence with each cylinder.

The intake port of each cylinder is connected to a surge tank 8, which is an intake air collection chamber, via a corresponding one of branch pipes provided in correspondence with the cylinders. An intake pipe 13 forming an intake air collection passage is connected to the surge tank 8 on the upstream side of the same. An air cleaner 9 is provided at an upstream end of the intake pipe 13. An air flow meter 5 for detecting the amount of intake air and an electrically controlled throttle valve 10 are incorporated in the intake pipe 13 in this order from the upstream side. The intake port, the branch pipe, the surge tank 8 and the intake pipe 13 form an intake air passage.

An injector (fuel injection valve) 12 which injects fuel into the intake air passage, particularly into the intake port is disposed in correspondence with each cylinder. Fuel jetted from the injector 12 is mixed with intake air to form an air-fuel mixture. This air-fuel mixture is drawn into the combustion chamber 3 when the intake valve Vi is opened, compressed with a piston 4 and combusted by being ignited with the ignition plug 7.

The exhaust port of each cylinder is connected to an exhaust pipe 6 forming an exhaust collection passage via a corresponding one of branch pipes provided in correspondence with the cylinders. The exhaust port, the branch pipe and the exhaust pipe 6 form an exhaust passage. Catalysts 11 and 19 are mounted in the exhaust pipe 6 formed of a three-element catalyst on upstream and downstream sides of the exhaust pipe 6. Pre-catalyst sensors 17 and 18 for detecting the air/fuel ratio of exhaust gas, i.e., a pre-catalyst sensor 17 and a post-catalyst sensor 18, are placed at positions before and after the upstream catalyst 11.

The pre-catalyst sensor 17 and the post-catalyst sensor 18 detect the air/fuel ratio on the basis of the concentration of oxygen in exhaust gas. The pre-catalyst sensor 17 is constituted by a so-called wide-range A/F sensor capable of continuously detecting the air/fuel ratio in a comparatively wide range. The pre-catalyst sensor 17 outputs a current signal proportional to the air/fuel ratio. On the other hand, the post-catalyst sensor 18 is constituted by an $O_2$ sensor having such a characteristic that the output voltage changes abruptly with a change in air/fuel ratio about the theoretical air/fuel ratio.

Components including the above-described ignition plug 7, the throttle valve 10 and the injector 12 are electrically connected to an electronic control unit (hereinafter referred to as ECU) 20 provided as a control means. The ECU 20 includes a CPU, a ROM, a RAM, input/output ports, a storage device and other components, each of which is not shown.

To the ECU 20, a crank angle sensor 14 for detecting the crank angle of the internal combustion engine 1, an accelerator opening sensor 15 for detecting the accelerator opening and other various sensors as well as the above-described air flow meter 5, pre-catalyst sensor 17 and post-catalyst sensor 18 are electrically connected via an A/D converter and other components not shown. The ECU 20 controls components including the ignition plug 7, the throttle valve 10 and the injector 12 on the basis of information including values detected by the various sensors so that the desired output is obtained, thereby controlling ignition timing, the injection quantity (i.e. the amount of fuel from the injector 12), fuel injection timing and the throttle opening and so on. The throttle opening is ordinarily controlled to the opening according to the accelerator opening.

The catalysts 11 and 19 simultaneously clear the NOx, HC and CO when the air/fuel ratio of exhaust gas flowing thereinto is equal to the theoretical air/fuel ratio (the stoichiometric value, e.g., A/F=14.6). Correspondingly, the ECU 20 controls the air/fuel ratio (so-called stoichiometric control) so that the air/fuel ratio (A/F) of exhaust gas flowing into the catalysts 11 and 19 equals the theoretical air/fuel ratio during normal operation of the internal combustion engine.

More specifically, the ECU 20 sets a target air/fuel ratio A/Ft equal to the theoretical air/fuel ratio and computes a fundamental injection amount such that the air/fuel ratio of the air-fuel mixture flowing into the combustion chamber 3 coincides with the target air/fuel ratio A/Ft. The ECU 20 corrects the fundamental injection amount in a feedback correction manner according to the difference between the actual air/fuel ratio A/Ffr detected with the pre-catalyst sensor 17 and the target air/fuel ratio A/Ft and energizes (turns on) the injector 12 only during an energization time period according to the corrected injection amount.

The air/fuel ratio of the exhaust gas supplied to the catalysts 11 and 19 is thereby maintained in the vicinity of the theoretical air/fuel ratio to deliver the maximum cleaning performance of the catalysts 11 and 19. Thus, the ECU 20 performs feedback control on the air/fuel ratio (fuel injection amount) so that the actual air/fuel ratio A/Ffr detected with the pre-catalyst sensor 17 becomes closer to the target air/fuel ratio A/Ft.

[Detection of Abnormality in A/F Sensor in the First Embodiment]

Detection of an abnormality in the A/F sensor in the present embodiment will be described in detail. An abnormality detection object in the present embodiment is the A/F sensor placed on the upstream side of the upstream catalyst 11, i.e., the pre-catalyst sensor 17.

(Identification Method in the First Embodiment)

In the present embodiment, a model of the system from the injector 12 to the pre-catalyst sensor 17 is formed with a primary delay element. Parameters in the primary delay element are identified (estimated) on the basis of the input air/fuel ratio set by a method described below and an air/fuel ratio based on the output from the pre-catalyst sensor 17 (also referred to as "output air/fuel ratio" below). An abnormality in a predetermined characteristic of the pre-catalyst sensor 17 is determined on the basis of the identified parameters.

ECU 20 computes a fuel injection amount Q on the basis of energization time of the injector 12. ECU 20 also obtains an intake air amount kl_IVC by intake air amount estimation processing described below. And the ratio of the intake air amount kl_IVC to the fuel injection amount Q (kl_IVC/Q) is used as the input air/fuel ratio. In the following, the input air/fuel ratio is expressed by u(t) (u(t)=kl_IVC/Q). The output air/fuel ratio equal to a value of the A/Ffr computed on the basis of the output from the pre-catalyst sensor 17. In the following, the output air/fuel ratio is expressed by y(t) (y(t)= A/Ffr). In the present embodiment, parameters in the primary delay element are identified from the way in which the output air/fuel ratio appears when exhaust gas reaches the pre-catalyst sensor 17 after a combustion process at a certain input air/fuel ratio u(t).

If a waste time is assumed to be zero for simplification, the primary delay element is expressed by G(s)=k/(1+Ts). In this expression, k is the gain of the pre-catalyst sensor 17 and T represents a time constant of the pre-catalyst sensor 17. The gain k is a value relating to the output in the characteristics of the pre-catalyst sensor 17. The time constant T is a value relating to responsivity in the characteristics of the pre-catalyst sensor 17.

A method of identifying the gain k and the time constant T in the present embodiment, executed by the ECU 20, will be concretely described below.

A transfer function for the primary delay system having the time constant T and the gain k is expressed as shown below.

$$G(s) = \frac{k}{1+Ts} \quad (1)$$

On the above equation, s→z bilinear transform (continuous→discrete transform)

$$s = \frac{2}{\Delta} \frac{1-z^{-1}}{1+z^{-1}} \quad (2)$$

(Δ:sampling interval)
(substitution for s) is performed. Then, equation (3) and (4) written below are obtained.

$$G(z) = \frac{\Delta \cdot k \cdot z^{-1} + \Delta \cdot k}{(\Delta - 2T) \cdot z^{-1} + (\Delta + 2T)} = \frac{z^{-1}+1}{b_2 z^{-1} + b_1} \quad (3)$$

$$\left( \because b_1 = \frac{\Delta - 2T}{\Delta \cdot k}, b_2 = \frac{\Delta + 2T}{\Delta \cdot k} \right) \quad (4)$$

Equation (4) is solved with respect to T and k to obtain equation (5) written below.

$$T = \frac{b_1 - b_2}{b_1 + b_2} \cdot \frac{\Delta}{2}, k = \frac{2}{b_1 + b_2} \quad (5)$$

If unknown parameters $b_1$ and $b_2$ are obtained in this way, the time constant T and gain k of the sensor can be obtained from equation (5).

If the measured input and outputs are described as:
$\bar{u}(t), \bar{y}(t)$
and if the corresponding z-transforms are described as:
$\bar{U}(z), \bar{Y}(z)$
then following equation (6) is obtained from above equation (3).

$$\bar{Y}(z) = G(z) \cdot \bar{U}(z) = \frac{z^{-1}+1}{b_2 z^{-1} + b_1} \cdot \bar{U}(z) \quad (6)$$

$$\rightarrow b_2 \bar{Y}(z) z^{-1} + b_1 \bar{Y}(z) = \bar{U}(z) z^{-1} + \bar{U}(z)$$

Inverse z-transform of equation (6) is performed to obtain the following equation:

$$b_2 \cdot \bar{y}(t-1) + b_1 \cdot \bar{y}(t) = \bar{u}(t-1) + \bar{u}(t) \quad (7)$$

The above equation is reorganized with respect to sampling times t, t−1, . . . , 1 to obtain following equation.

$$\begin{bmatrix} \bar{u}(t) + \bar{u}(t-1) \\ \bar{u}(t-1) + \bar{u}(t-2) \\ \ldots \\ \bar{u}(2) + \bar{u}(1) \end{bmatrix} = \begin{bmatrix} \bar{y}(t) & \bar{y}(t-1) \\ \bar{y}(t-1) & \bar{y}(t-2) \\ & \ldots \\ \bar{y}(2) & \bar{y}(1) \end{bmatrix} \begin{bmatrix} b_1 \\ b_2 \end{bmatrix} \quad (8)$$

A redefinition:

$$y(t) = \bar{u}(t) + \bar{u}(t+1)$$

$$\phi(t) = [\bar{y}(t), \bar{y}(t-1)]^T \quad (9)$$

is then made to enable the following expression:

$$\begin{bmatrix} y(t) \\ y(t-1) \\ \ldots \\ y(2) \end{bmatrix} = \begin{bmatrix} \phi^T(t) \\ \phi^T(t-1) \\ \ldots \\ \phi^T(2) \end{bmatrix} \begin{bmatrix} b_1 \\ b_2 \end{bmatrix} \rightarrow y = F \cdot \theta \quad (10)$$

A least-square identified value of an identification parameter vector θ including unknown parameters $b_1$ and $b_2$ can be identified as shown by the following equation:

$$\hat{\theta} = (F^T F)^{-1} F^T \cdot y$$

Furthermore T and k can be obtained form equation (5).
From the above, inverse matrix $(F^T F)^{-1}$ may be computed to enable calculation of
$\hat{\theta}(t)$.

However, inverse matrix causes increase of the amount of computation. This is undesirable in view of implementation in the ECU. Therefore, recursively solving the inverse matrix portion will be considered.

$P(t) = (F^T F)^{-1}$ is first assumed.

$$\hat{\theta}(t) = P(t) F^T \cdot y \quad (11)$$

$$= P(t) \left( [\phi(1), \phi(2), \ldots, \phi(t)] \begin{bmatrix} y(1) \\ \vdots \\ y(t) \end{bmatrix} \right)$$

$$= P(t) \sum_{k=1}^{t} \phi(k) y(k)$$

From equation (11), the following expression may also be made.

$$\hat{\theta}(t-1) = P(t-1)\sum_{k=1}^{t-1}\phi(k)y(k)$$

Accordingly, again from equation (11), $$\hat{\theta}(t) = P(t)\left(\sum_{k=1}^{t-1}\phi(k)y(k) + \phi(t)y(t)\right) \quad (12)$$
$$= P(t)\{P^{-1}(t-1)\cdot\hat{\theta}(t-1) + \phi(t)y(t)\}$$

Also, $$P(t) = (F^T F)^{-1} \quad (13)$$
$$= \left([\phi(1), \phi(2), \ldots \phi(t)]\begin{bmatrix}\phi^T(1)\\ \vdots \\ \phi^T(t)\end{bmatrix}\right)^{-1}$$
$$= \left(\sum_{k=1}^{t}\phi(k)\phi^T(k)\right)^{-1}$$

Equation (13) is transformed into $$P^{-1}(t) = \sum_{k=1}^{t}\phi(k)\phi^T(k) \quad (14)$$
$$= \sum_{k=1}^{t-1}\phi(k)\phi^T(k) + \phi(t)\phi^T(t)$$
$$= P^{-1}(t-1) + \phi(t)\phi^T(t)$$

The portion "$P^{-1}(t-1)$" of equation (12) is eliminated by using equation (14) to enable expression of $\hat{\theta}(t)$ by the following recursive formula:

$$\hat{\theta}(t) = P(t)\{(P^{-1}(t) - \phi(t)\phi^T(t))\cdot\hat{\theta}(t-1) + \phi(t)y(t)\} \quad (15)$$
$$= \hat{\theta}(t-1) + P(t)\phi(t)(y(t) - \phi^T(t)\cdot\hat{\theta}(t-1))$$

In a theorem relating to the following inverse matrix:

$$(A^{-1}+C^T B^{-1}D)^{-1} = A - AC^T(DAC^T + B)^{-1}DA, \quad (16)$$

if substitutions expressed by $$A \rightarrow P(t-1), C \rightarrow \phi^T(t), B \rightarrow 1, B \rightarrow 1, D \rightarrow \phi^T(t)$$

are made, equation (14) can be expressed as follows.

$$(P^{-1}(t-1) + \phi(t)\phi^T(t))^{-1} = (P^{-1}(t))^{-1} \quad (17)$$
$$= P(t)$$
$$= P(t-1) - P(t-1)\phi(t)$$
$$(\phi^T(t)P(t-1)\phi(t) + 1)^{-1}\phi^T(t)\cdot$$
$$P(t-1)$$

By transforming equation (17) after multiplying the two sides thereby by $\phi(t)$, P(t) can also be expressed recursively, as shown below.

$$(\phi^T(t)P(t-1)\phi(t) + 1 \text{ is Scalar}) \quad (18)$$
$$P(t)\phi(t) = P(t-1)\phi(t)\cdot\frac{1}{\phi^T(t)P(t-1)\phi(t)+1} = K(t)$$

Further, a prediction error is defined as shown below.

$$\epsilon(t) = y(t) - \phi^T(t)\cdot\hat{\theta}(t-1) \quad (19)$$

Equations (18) and (19) are substituted in equation (15) to finally obtain the following recursive formula:

$$\hat{\theta}(t) = \hat{\theta}(t-1) + K(t)\cdot\epsilon(t) \quad (20)$$

Thus, $$\hat{\theta} = (F^T F)^{-1} F^T \cdot y$$

can be recursively solved.

Equation (20) is a function of the values at the present sampling time t and the preceding sampling time t−1. The meaning of this equation is nothing but that b1 and b2, i.e., T and k are updated every time on the basis of the present value and the preceding value. Thus, the time constant T and the gain k are identified one by one by the one-by-one least square method. This way of one-by-one identification makes it possible to reduce the computation load and to reduce the capacity of a buffer for temporarily storing data in comparison with the way in which a multiplicity of sample data items are obtained and temporarily stored and identification is performed on the basis of the data. This way of identification is therefore suitable for implementation in ECUs (particularly ECUs for motor vehicles).

(Processing Relating to Setting of the Input Air/Fuel Ratio in the First Embodiment)

A process for setting the input air/fuel ratio u(t) used in the above-described identification method will next be described. In the present embodiment, the ECU 20 is programmed to perform processing for estimating the intake air amount kl_IVC when the intake valve is closed. In the present embodiment, the in-cylinder air/fuel ratio when the intake valve is closed is computed on the basis of the amount of intake air obtained by this estimation processing and is set as input air/fuel ratio u(t). In the following, description will be made of estimation of the intake air amount and so on with respect to the cylinder 2. The contents of the following description also apply to an internal combustion engine having a plurality of cylinders. In such a case, the concept of the present embodiment may be applied with respect to each individual cylinder.

To be more specific, the present embodiment includes following four processing: (i) processing for obtaining an intake valve closing time (hereinafter also referred to as "IVC time obtaining processing"), (ii) computation processing for computing estimated values of the intake air amount one by one (also referred to as "estimated value one-by-one computation processing"), (iii) computation processing for estimating the intake air amount when the intake valve is closed by using the estimated values computed one by one (also referred to as "kl_IVC computation processing"), and (iv) processing for estimating the air/fuel ratio by using the estimated intake air amount (also referred to as "in-cylinder air/fuel ratio computation processing").

In the present embodiment, the in-cylinder air/fuel ratio finally computed by the above-described processing (iv) is set as input air/fuel ratio u(t). The processings (i) to (iv) will be described in due order.

(i) IVC Time Obtaining Processing

In the present embodiment, the ECU 20 is programmed to perform processing for obtaining a time at which the intake valve Vi is closed (IVC: Intake Valve Close) after an intake stroke (also referred to as "IVC time" below) on the basis of information including the output from the crank angle sensor 14. Specifically, this IVC time obtaining processing can be implemented, for example, by executing processing described below when the cylinder 2 enters the state corresponding to the intake TDC time. First, the valve working angle is set in advance as a known value before intake TDC timing comes. Because the valve working angle is known, the IVC time can be computed on the basis of the number of engine revolutions NE and the valve working angle at TDC timing.

(ii) Estimated Value One-by-One Computation Processing

In the present embodiment, the ECU 20 is programmed to perform "estimated value one-by-one computation processing" for repeatedly computing the amount of intake air in the cylinder 2 in a predetermined cycle. In this processing, the ECU 20 repeatedly computes an estimated value kl in a predetermined cycle. The estimated value kl of the amount of intake air in the cylinder 2 (also referred to simply as kl below) is computed on the basis of information including the throttle opening TA and the number of engine revolutions NE by using a physical model such as an intake pipe model.

In this processing, one-by-one computation using a physical model or the like is performed. Accordingly, computation times are discretely set and the cycle of computation is a fixed value of, for example, 8 ms (milliseconds). More specifically, a technique disclosed in Japanese Patent Laid-Open No. 2002-130041 can be used as this estimated value one-by-one computation processing. Also, other various known intake air estimation techniques are applicable to this processing. Therefore, this processing will not be described in detail.

(iii) kl_IVC Computation Processing

A technique to estimate the intake air amount at the time when the intake valve Vi is closed in the present embodiment will next be described. The actual amount of intake air in the cylinder 2 is determined at a point in time when the intake valve Vi is closed after an intake stroke (that is, at the IVC time). If estimation of the value of the amount of intake air determined at the IVC time (also referred to as "kl_IVC" below) can be performed with accuracy, more accurately control according to the actual amount of intake air is enabled.

As mentioned above, estimated value one-by-one computation processing is processing for repeatedly computing kl in a certain fixed cycle. On the other hand, the cycle of the IVC time is not completely fixed and is changed in some case due to some of various causes (e.g., a change in the number of revolutions, a change in intake valve operation positively made with a variable valve timing mechanism or the like, or an unexpected error in intake valve operation).

In the first embodiment, therefore, following processing method is executed to estimate kl_IVC with accuracy even in a situation where a relationship between the IVC time and kl computation timing changes. Description will be made below separately of kl_IVC computation processing with reference to FIG. 2.

Figure 2:
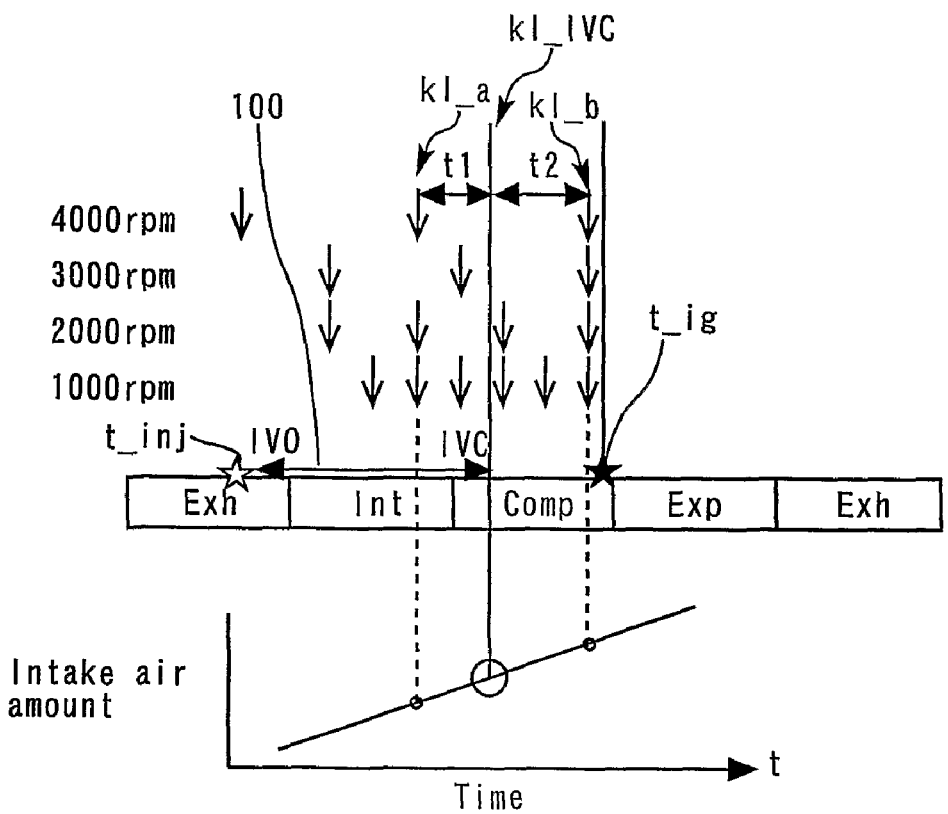
FIG. 2 is a diagram showing a concept of estimation of an amount of intake air according to the first embodiment of the present invention.

FIG. 2 is a diagram showing, with respect to a lapse of time, strokes in one combustion cycle of the cylinder 2, computation of kl in the above-described estimated value one-by-one computation processing and the intake air amount estimation technique specific to the present embodiment. At a center of FIG. 2, a timing chart is shown in which the progress of each stroke in the cycle of combustion in the cylinder 2 is shown along the direction of lapse of time indicated as a rightward direction on the figure.

Many arrows facing downward in FIG. 2 correspond to times at which estimated values kl are computed in the described estimated value one-by-one computation processing. As described above, kl is repeatedly computed in a predetermined cycle in the estimated value one-by-one computation processing. FIG. 2 also shows changes in the frequency of computation of kl with respect to the number of engine revolutions NE. As shown in FIG. 2, the frequency of computation of kl in each of combustion cycles (referred to simply as "one combustion cycle" below) changes according to the number of engine revolutions NE. This is because if the number of engine revolutions NE, i.e., the rotational speed, increases, the time for one combustion cycle becomes shorter.

More specifically, when the number of engine revolutions NE is 4000 rpm, the exhaust, intake, compression and subsequent strokes progress rapidly in comparison with time intervals at which kl is computed. Due to this condition, the number of kl values obtained on one combustion cycle is comparatively reduced. On the other hand, when NE is relatively small, the frequency at which kl is computed in one combustion cycle is increased and the number of kl values obtained per combustion cycle is relatively increased. Consequently, as also shown in FIG. 2, the number of kl values computed during a time period about the time between the intake stroke and the compression stroke is increased with the changes in number of revolutions to 3000 rpm, to 2000 rpm and to 1000 rpm.

An arrow 100 in FIG. 2 shows a period of time in which intake valve Vi opens in one combustion cycle. As shown in FIG. 2, the intake valve Vi opens (IVO: Intake Valve Open) slightly before the intake stroke starts, and the intake valve Vi closes (IVC) after the intake stroke ends with a slight delay. In the following description, a point in time at which the intake valve Vi is opened is also referred to as "IVO time" and a point in time at which the intake valve Vi is closed is also referred to as "IVC time".

FIG. 2 also includes a diagram which visualizes a change of amount of intake air below the timing chart. The diagram illustrates a change of the amount of intake air drawn into the cylinder 2. As shown in the diagram, the amount of intake air increases after the intake valve Vi opens at the IVO time. It should be noted that, "t_inj" in FIG. 2 indicates a time at which the injection quantity for the present combustion process is computed on the basis of a target air/fuel ratio, and "t_ig" in FIG. 2 indicates a time at which ignition timing of the ignition plug 7 is computed.

As described above, the relationship between the IVC time and the kl computation time changes as shown in FIG. 2 due to the change of the IVC time. In the present embodiment, to obtain kl_IVC with accuracy under such a condition, kl_IVC is estimated from two kl values computed at times before and after the IVC time and the ratio of the computation times.

More specifically, kl_IVC is estimated on the basis of below equations (21) to (23).

$$kl\_IVC = kl\_a + (kl\_b - kl\_a) \times t_1/(t_1 + t_2) \quad (21)$$

$$t_1 = T_{ivc} - T_{kl\_a} \quad (22)$$

$$t_2 = T_{kl\_b} - T_{ivc} \quad (23)$$

It should be noted that kl_a is a kl that is computed immediately before the IVC time, kl_b is a kl that is computed immediately after the IVC time, $t_1$ is a time period from a time at which kl_a is computed to the IVC time, and $t_2$ is a time period from the IVC time to a time at which kl_b is computed. $T_{ivc}$ is the IVC time obtained independently of kl computation processing by above-described processing programmed in the ECU 20. $T_{kl\_a}$ and $T_{kl\_b}$ are times at which kl_a and kl_b are computed.

According to this technique, the time periods $t_1$ and $t_2$ are used for estimation of kl_IVC. Hence, even if there occurs a change in the relationship between IVC time and kl computation time, the change can be reflected in estimation of the amount of intake air. As a result, the amount of intake air at the intake valve closing time can be estimated with high accuracy.

As described above, the amount of intake air is determined at the intake valve Vi closing time. Therefore, the accuracy of intake air amount estimation can be improved by using kl obtained after the IVC time (i.e., kl_b) for the estimation. Also, information on changes in the amount of intake air about the IVC time can be fully used for the estimation by using both the kl values (kl_a and kl_b) obtained before and after the IVC time. Thus, the technique according to the present embodiment enables estimation of kl_IVC with high accuracy and with flexibility to the change of the IVC time.

(iv) In-Cylinder Air/Fuel Ratio Computation Processing

Computation of the in-cylinder air/fuel ratio of the internal combustion engine 1 using the estimated values of the intake air amount described above will next be described. In the present embodiment, first, kl_IVC is estimated by equation (21) shown above. Next, the in-cylinder air/fuel ratio is computed on the basis of the following equation (24):

$$\text{In-cylinder air/fuel ratio} = kl\_\text{IVC/injection quantity} \qquad (24)$$

It should be noted that kl_IVC and the injection quantity substituted in equation (24) are obtained in the same combustion cycle. For example, in the combustion cycle shown in FIG. 2, the value of the injection quantity computed at t_inj can be used in equation (24). As a result of this calculation, estimation value of the air/fuel ratio can be obtained with high accuracy.

In the present embodiment, the in-cylinder air/fuel ratio obtained by equation (24) is set as input air/fuel ratio u(t).

It should be noted that, the IVC time used for computation of kl_IVC is not limited to a value obtained by prediction before the time at which the actual intake valve 16 is closed. For example, a definite time regarded as a time at which the intake valve 16 was actually closed may be obtained ex post facto by monitoring the operation of the intake valve 16 by, for example, using various sensors such as cam angle sensors.

(Sensor Characteristic Abnormality Determination Method in the First Embodiment)

A method determining an abnormality in sensor characteristics by using the parameters identified by the above-described identification method will next be described.

When an abnormality occurs in output characteristics of the pre-catalyst sensor 17, the gain k becomes higher than the value under the normal condition and the sensor output heightens (increases), or the gain k becomes smaller than the value under the normal condition and the sensor output decreases (reduces). It is, therefore, possible to determine a sensor output heightening abnormality or decreasing abnormality by comparing the identified gain k with a predetermined value.

More specifically, if the identified gain k is higher than a predetermined value $ks_1$ that is predetermined as a gain heightening abnormality determination value, an output heightening abnormality in the pre-catalyst sensor 17 is determined. If the identified gain k is lower than a predetermined value $ks_2$ ($<ks_1$) that is predetermined as a gain reduction abnormality determination value, an output decreasing abnormality in the pre-catalyst sensor 17 is determined. If the identified gain k is equal to or higher than $ks_2$ and equal to or lower than $ks_1$, it is determined that the pre-catalyst sensor 17 is normal with respect to its output characteristics.

In most of cases where an abnormality occurs in responsivity of the pre-catalyst sensor 17, the time constant T becomes larger than the value under the normal condition, and the sensor output is delayed. It is, therefore, possible to determine a sensor responsivity abnormality by comparing the identified time constant T with a predetermined value.

More specifically, if the identified time constant T is larger than a predetermined time constant abnormality determination value Ts, it is determined that a response delay has occurred and the responsivity of the pre-catalyst sensor 17 is abnormal. If the identified time constant T is equal to or lower than the predetermined time constant abnormality determination value Ts, it is determined that the responsivity of the pre-catalyst sensor 17 is normal.

In abnormality detection in the first embodiment as described above, not a simple abnormality in the A/F sensor but an abnormality in a predetermined characteristic of the A/F sensor is determined. Also, abnormalities in two characteristics, i.e., responsivity and output, of an A/F sensor are determined simultaneously and individually, through the two identified parameters T and k. Thus, a highly suitable configuration for detection of abnormalities in an A/F sensor can be implemented.

[Effects of the First Embodiment]

According to the above-described first embodiment, the in-cylinder air/fuel ratio is used as input air/fuel ratio u(t), to achieve effects described below. FIG. 3 is a diagram for explaining the effects of the first embodiment, showing an image of the identification operation on the A/F sensor response characteristic model.

Figure 3A:
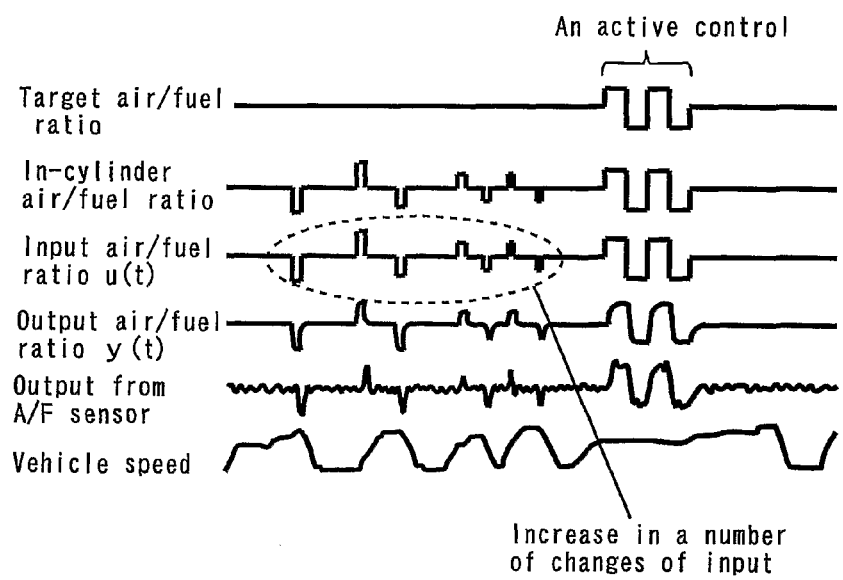
FIG. 3A is a diagram showing an image of the identification operation according to the first embodiment of the present invention.
Figure 3B:
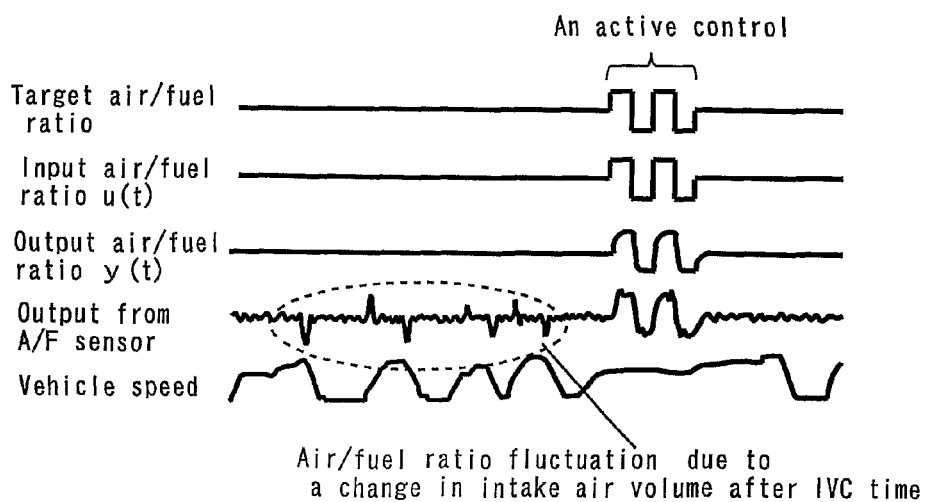
FIG. 3B is a diagram showing a comparative example.

FIG. 3A shows an image of the identification operation according to the first embodiment, i.e., an image of the identification operation on the response model in a case where the amount of intake air when the intake valve is closed is considered. FIG. 3B shows an image of the identification operation on the response model in a case where a target air/fuel ratio is used as input information to be compared with the present embodiment. Each of FIGS. 3A and 3B shows following information, with the time axis pointing to the right, in order from the top:

changes in the target air/fuel ratio with time,
changes in the input air/fuel ratio u(t) to the model with time,
changes in the output air/fuel ratio y(t) of the output from the model according to the input air/fuel ratio u(t) with time,
changes in the output from the A/F sensor with time, and
changes in the operating state of the internal combustion engine (vehicle speed in a case where the internal combustion engine 1 is mounted on a vehicle) with time.

In a port-injection internal combustion engine such as that in the present embodiment, the operation of the internal combustion engine progresses in order of setting of a target air/fuel ratio, calculating an estimated value of the amount of intake air based on an air flow meter or the like, setting of an injection quantity, fuel injection, intake valve closing, combustion process. During this operation, there is a possibility of occurrence of a difference between an estimated value of the amount of intake air based on the air flow meter or the like and the actual amount of the intake air at the time of intake valve closing, such that the target air/fuel ratio and the actual air/fuel ratio do not coincide with each other. In such a case, the output from the A/F sensor fluctuates even though the target air/fuel ratio is constant, as shown in FIG. 3A.

The inventors of the present application have earnestly made studies about this point and thought of a technique of utilizing such fluctuations of A/F sensor output for identification by using the value of the in-cylinder air/fuel ratio as input air/fuel ratio u(t). The in-cylinder air/fuel ratio is exhibited as a more accurate air/fuel ratio including the above-described difference in intake air amount. That is, when a difference in intake air amount is produced, a change corresponding to the difference is reflected in the in-cylinder air/fuel ratio. As a result of setting the in-cylinder air/fuel ratio as input air/fuel ratio u(t), therefore, the output air/fuel ratio y(t) changes frequently (finely) so that the changes therein are closer to the changes in the actual air/fuel ratio, as shown in FIG. 3A.

On the other hand, in a comparative example shown in FIG. 3B, a target air/fuel ratio is set as a value u(t) to be input to the model for one-by-one identification. In this case, in a situation where the target air/fuel ratio is fixed at a particular air/fuel ratio (e.g., in the vicinity of the theoretical air/fuel ratio), the input air/fuel ratio u(t) is also a fixed value and the output air/fuel ratio y(t) from the model is also constant. According to the technique in the comparative example, therefore, the input air/fuel ratio u(t) is a fixed value even in a situation where fluctuations in air/fuel ratio due to differences in intake air amount are detected on the A/F sensor side.

If the frequency at which the output air/fuel ratio y(t) changes is increased, chances for one-by-one identification (identification chances) are increased. According to the present embodiment as shown in FIG. 3A, fluctuations in air/fuel ratio due to the above-described differences in intake air amount are grasped and utilized for identification to increase identification chances. On the other hand, in a case where a target air/fuel ratio is used as input air/fuel ratio u(t) as in the comparative example shown in FIG. 3B, the output air/fuel ratio y(t) is a fixed value during normal operation and no identification chances can be obtained. Consequently, the identification operation in the first embodiment shown in FIG. 3A is capable of obtaining increased identification chances in comparison with the identification method in which a target air/fuel ratio is given as input air/fuel ratio u(t) as shown in FIG. 3B.

A state in which active control for obtaining identification chances is also shown in FIGS. 3A and 3B. Active control is control for changing the target air/fuel ratio by changing the injection quantity through open-loop control. The target air/fuel ratio is changed by active control, the change thereby made is reflected in the input air/fuel ratio u(t) and the output air/fuel ratio y(t) is finally changed. One-by-one identification can be performed by comparing the change in the output air/fuel ratio y(t) and the behavior of the A/F sensor output.

However, the time period during which active control can be executed is restricted in some case from the viewpoint of obtaining a good emission characteristic. In the time period during which execution of active control is prohibited, no identification chances can be obtained in the comparative example. There is also a possibility of a change in target air/fuel ratio by active control adversely affecting an emission characteristic. Consequently, the time period during which identification can be performed is restricted in the technique in the comparative example.

In this respect, the present embodiment shown in FIG. 3A enables obtaining identification chances without resort to active control unlike the comparative example shown in FIG. 3B. In other words, identification of the parameters of the primary delay element can be continuously progressed even during normal operating condition. Thus, according to the present embodiment, an improvement in the accuracy of input information and an increase in the number of identification chances are simultaneously achieved to enable detection of an abnormality in the exhaust gas sensor with high accuracy based on the parameters identified with high accuracy.

The state of active control during identification operation in the present embodiment is shown in FIG. 3A for the sake of convenience in explanation. That is, active control may be omitted in the present embodiment, because identification chances can be obtained without resort to active control in the present embodiment, as described above. However, active control may be combined with the present embodiment if necessary.

According to the present embodiment, fluctuations in the A/F sensor output in a situation where the target air/fuel ratio is constant can be effectively utilized as information for parameter identification instead of being recognized as irregularities in air/fuel ratio due to disturbance. In the case of the comparative example shown in FIG. 3B, fluctuations in the A/F sensor output in a situation where the target air/fuel ratio is constant are necessarily treated as an error due to disturbance. In this respect, according to the present embodiment, fluctuations in the A/F sensor output in a situation where the target air/fuel ratio is constant are replaced with useful information to obtain the advantage of increasing identification chances as well as the advantage of reducing information recognized as an error due to disturbance in the output from the pre-catalyst sensor 17.

In the above-described first embodiment, (i) processing for obtaining the IVC time described above corresponds to the "time obtaining means" of the above-described first aspect of the present invention. Also, (ii) estimated value one-by-one computation processing in the above-described first embodiment corresponds to the "estimated value computation means" of the above-described first aspect of the present invention; (iii) kl_IVC computation processing to the "computation means for estimation" of the above-described first aspect of the present invention; and (iv) in-cylinder air/fuel ratio computation processing to "in-cylinder air/fuel ratio computation means" of the above-described first aspect of the present invention. In the first embodiment, the injection quantity of the injector 12 corresponds to the "amount of fuel supply" in the above-described first aspect of the present invention.

The "identification means" of the above-described first aspect of the present invention is realized by means of various computations described with respect to the identification method in the above-described first embodiment. Also, in the first embodiment, the technique of comparing the time constant T and gain k with various determination values corresponds to the "abnormality determination means" in the above-described first aspect of the present invention and to the "parameter abnormality determination means" in the above-described third aspect of the present invention.

Modified Example of the First Embodiment

First Modified Example

In the first embodiment, various parameters are identified by using the described one-by-one identification method. However, the present invention is not limited to this. The in-cylinder air/fuel ratio based on kl_IVC may be used as model input for identification, in a parameter identification method different from that in the first embodiment, on the basis of the concept of the present invention.

Second Modified Example

In the first embodiment, the pre-catalyst sensor 17 (A/F sensor) is set as an abnormality detection object. However, the present invention is not limited to this. The post-catalyst sensor 18 ($O_2$ sensor) may be set as an abnormality detection object. In such a case, the in-cylinder air/fuel ratio is used as input air/fuel ratio u(t) as in the first embodiment, with modifications including replacing the output from the pre-catalyst sensor 17 used in the first embodiment with the output from the post-catalyst sensor 18. This enables various parameters (the gain and the time constant for example) corresponding to the characteristics of the post-catalyst sensor 18 to be identified.

Third Modified Example

The third modified example is characterized by setting the catalyst 11 as an abnormality detection object in the same construction as that in the first embodiment. The third modified example will be described on the basis of the construction of the internal combustion engine 1.

In the third modified example, parameters of a numerical expression for a model of characteristics relating to the catalyst 11 including oxygen storage capacity (OSC) are identified by utilizing the output from the post-catalyst sensor 18. In such a case, a transfer function used for identification may be defined, for example, by the following function including waste time L:

$$G(s)=k/(1+Ts)+\exp(-Ls) \qquad (25)$$

As techniques relating to modeling of catalysts and OSC, techniques such as those disclosed in Japanese Patent Laid-Open Nos. 2003-97334, 2004-316457, and 2004-360591 are known. Therefore, setting of a transfer function to be identified and so on can be made by using some of these techniques.

In the third modified example, various parameters (k, T, L) of equation (25), in place of parameters of equation (1), are identified. In the third modified example, the first term in equation (25) is regarded as a characteristic of the post-catalyst sensor 18 for simplification, and OSC is grasped on the basis of the parameter L of the second term exponential function $\exp(-Ls)$. Determination as to the existence/nonexistence of an abnormality in the catalyst 11 can be made by comparing this waste time L with a predetermined determination value $L_0$.

The in-cylinder air/fuel ratio based on kl_IVC may be used as input air/fuel ratio u(t) at the time of identification to obtain the same effects as those of the first embodiment including increasing identification chances. It should be noted that the predetermined determination value $L_0$ can be set in advance by measuring a waste time in a case where OSC is reduced to such a degree that degradation of the catalyst 11 is recognized, and determining the value $L_0$ on the basis of the measured waste time.

It should be noted that, the parameters k and T in equation (25) may be treated by assuming that the first term of equation (25) includes both a characteristic of the post-catalyst sensor 18 and catalyst characteristic from the viewpoint of grasping the catalyst characteristic with higher accuracy, because there is a possibility of a gas (oxygen) leaking out on the downstream side of the catalyst depending on the ability of the catalyst before an OSC limit is reached. Equation (25) is not exclusively used as a numerical expression expressing the characteristic of the catalyst. With respect to modeling of catalyst characteristics, a number of techniques from the viewpoint of more precise modeling are known. Therefore some of corresponding known various numerical expressions expressing catalyst characteristics may be used in place of equation (25).

Identification of the parameters in the third modified example may be performed when the post-catalyst sensor 18 exhibits normal characteristics, because determination of an abnormality in the catalyst 11 is facilitated.

In the above-described third modified example of the first embodiment, the technique of comparing the waste time L with the determination value corresponds to the "abnormality determination means" in the above-described fourth aspect of the present invention and to the "parameter abnormality determination means" in the sixth aspect of the present invention.

Second Embodiment

[Construction of the Second Embodiment]

Figure 4:
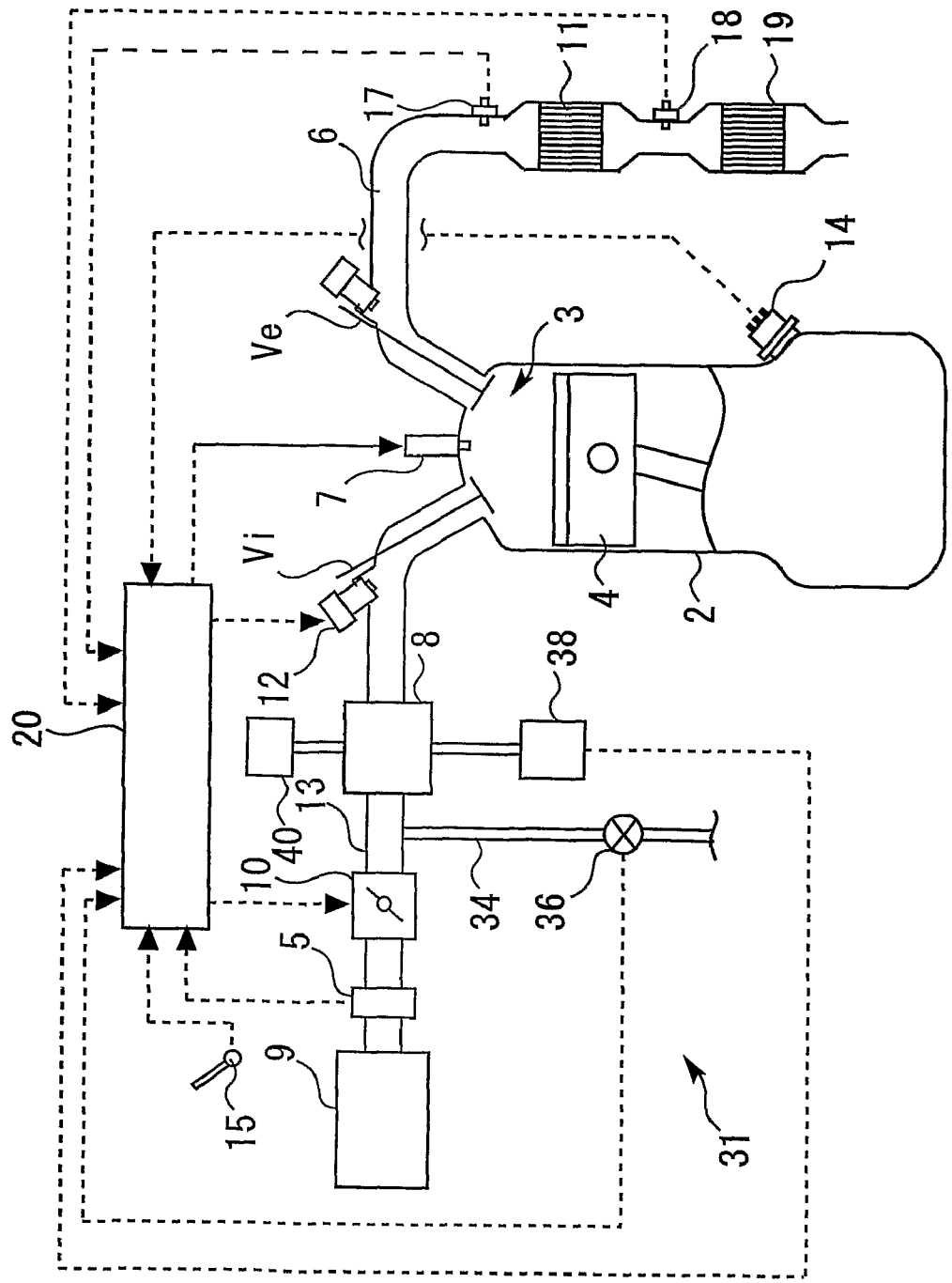
FIG. 4 is a diagram schematically showing an internal combustion engine according to a second embodiment of the present invention.

An internal combustion engine 31 according to the second embodiment will be described with reference to FIG. 4. As shown in FIG. 4, the construction of the internal combustion engine 31 has certain portions in common with the construction of the internal combustion engine 1 in the first embodiment. The same components as those in the internal combustion engine 1 are indicated by the same reference characters. The description for the same components will not be repeated.

The internal combustion engine 31 has a purge passage 34 connected to the intake pipe 13 at a position downstream of the air flow meter 5. In the purge passage 34, a purge valve 36 is provided. The purge valve 36 can change the state of communication between the purge passage 34 and an arrangement on the canister side (not shown). The internal combustion engine in second embodiment has a brake booster 38, which is connected to the surge tank 8.

The internal combustion engine 31 is provided with a mechanism (PCV mechanism: Positive Crankcase Ventilation mechanism) 40 for refluxing a blowby gas to the intake air passage. In FIG. 4, the PCV mechanism 40 is shown by being simplified for convenience sake. The PCV mechanism 40 is interposed between the crankcase (not shown) of the cylinder 2 and the surge tank 8 and is capable of refluxing to the intake air passage blowby gas blown into the crankcase. Thus, various mechanisms are connected to the intake air passage in the internal combustion engine 31. The purge valve 36 and the brake booster 38 are connected to the ECU 20.

In the internal combustion engine 31, the ECU 20 is programmed to perform purge gas concentration learning processing. Also, in the internal combustion engine 31, the ECU 20 is programmed to perform processing for estimation of the amount of oil-diluted fuel and processing for estimation of the amount of fuel attached to a wall surface of the intake port. There are known techniques relating to details of these processing. Therefore the details of these processings will not be described in this specification.

It is assumed that the internal combustion engine according to the second embodiment includes A/F sensor abnormality determination processing (including model parameter identification processing), as does that in the first embodiment. However, the second embodiment is assumed to not include kl_IVC estimation computation processing described in the description of the first embodiment.

[Features of the Second Embodiment]

The second embodiment has two features described below. The first feature resides in detecting the amount of air delivery to or from the intake air passage of the internal combustion engine 1 on the downstream side of the air flow meter 5 and computing the in-cylinder air/fuel ratio by considering the delivered amount of air. The second feature resides in computing the in-cylinder air/fuel ratio by considering factors other than the amount of injection from the injector. Each feature will be described in detail below.

(First Feature of the Second Embodiment)

In a case where fresh air including purge fuel and oil-diluted fuel is caused to flow downstream of the air flow meter 5 as in the present embodiment, there is a possibility of the actual amount of air in the cylinder differing from the air flow meter output value. Also, brake booster operation may cause the actual amount of intake air in the cylinder to become larger or smaller than the air flow meter output value.

In the second embodiment, therefore, following three factors (i), (ii), (iii) are reflected in the model input.

(i) The amount of fresh air supplied into the cylinder by purge.

(ii) The amount of fresh air supplied into the cylinder by blowby gas.

(iii) The amount of air supplied into or drown out from the cylinder by the brake booster operation.

The amounts of air to be reflected are determined, for example, by techniques described below.

First, the amount of air flowing into the intake air passage due to operation of the purge valve 32 and the brake booster 34 are measured. Also, a condition that the amount of air supplied into the cylinder can be calculated according to operation of the PCV mechanism 40 is established.

Changes in the amounts of air (i) to (iii) described above are added to the amount of intake air obtained on the basis of the air flow meter output, thereby computing the actual amount of intake air in the cylinder 2 (also referred to as "actual in-cylinder intake air amount" below). Thereafter, the in-cylinder air/fuel ratio is computed by setting this actual in-cylinder intake air amount as the amount of intake air. The amounts of air (i) to (iii) described above can be reflected in the input air/fuel ratio u(t) by setting this in-cylinder air/fuel ratio as the input air/fuel ratio u(t). In this way, the input air/fuel ratio u(t) with improved accuracy can be given to the model.

(Second Feature of the Second Embodiment)

In a case where fresh air including purge fuel and oil-diluted fuel is caused to flow downstream of the air flow meter 5, this fresh air causes fuel to flow into the intake air passage together with air. Also, in a case where fuel is supplied by port injection as in the present embodiment, failure to cause the entire fuel to flow into the cylinder occurs due to wall surface attachment or, conversely, flowing of fuel into the cylinder by detachment of attached fuel occurs. There is, therefore, a possibility of the actual amount of fuel in the cylinder not coinciding with the injection quantity of the injector 12 based on the target air/fuel ratio.

In the second embodiment, therefore,

In the second embodiment, therefore, following three factors (iv), (v), (vi) are reflected in the model input.

(iv) The amount of fuel supplied into the cylinder by purge.

(v) The amount of oil-diluted fuel supplied to the cylinder by blowby gas.

(vi) A change in fuel amount due to wall surface attachment. The amounts of fuel to be reflected can be determined, for example, by a technique described below.

First, a condition for enabling grasping the amount of fuel flowing into the cylinder 2 when purge is executed is established by using both a purge gas concentration learning method and a method of grasping the amount of purge gas flowing into the intake air passage according to the amount of operation of the purge valve 32. Also, a condition for enabling grasping the amount of fuel supposed to flow into the cylinder 2 according to the operating condition of the internal combustion engine 31 is established by using processing for estimation of the amount of oil-diluted fuel with respect to blowby gas and processing for estimation of the amount of fuel attached to the wall surface with respect to the influence of wall surface attachment.

The amount of fuel supplied into the cylinder 2 in correspondence with the above-described factors (iv) to (vi) is subtracted from the injection quantity of the injector 12, thereby computing the actual amount of fuel in the cylinder 2 (also referred to as "actual in-cylinder fuel amount"). The in-cylinder air/fuel ratio computed on the basis of this actual in-cylinder fuel amount is set as the input air/fuel ratio u(t). The amounts of fuel (iv) to (vi) described above can be reflected in the input air/fuel ratio u(t) thereby.

The above-described first and second features of the second embodiment in combination can be expressed by the following equation (26):

$$\text{Input air/fuel ratio } u(t) = \text{actual in-cylinder intake air amount/actual in-cylinder fuel amount} \quad (26)$$

The actual in-cylinder intake air amount in equation (26) is the amount of intake air computed on the basis of the output from the air flow meter 5 and the factors (i) to (iii), as described above. The actual in-cylinder fuel amount in equation (26) is the amount of fuel computed on the basis of the injection quantity of the injector 12 and the factors (iv) to (vi), as described above.

Equation (26) shown above is used in place of equation (24) of the first embodiment to be utilized for identification of the parameters of the primary delay element. Determination as to the existence/nonexistence of an abnormality in the pre-catalyst sensor 17 can be made by comparing the identified parameters with various determination values, as in the first embodiment.

[Effects of the Second Embodiment]

Figure 5:
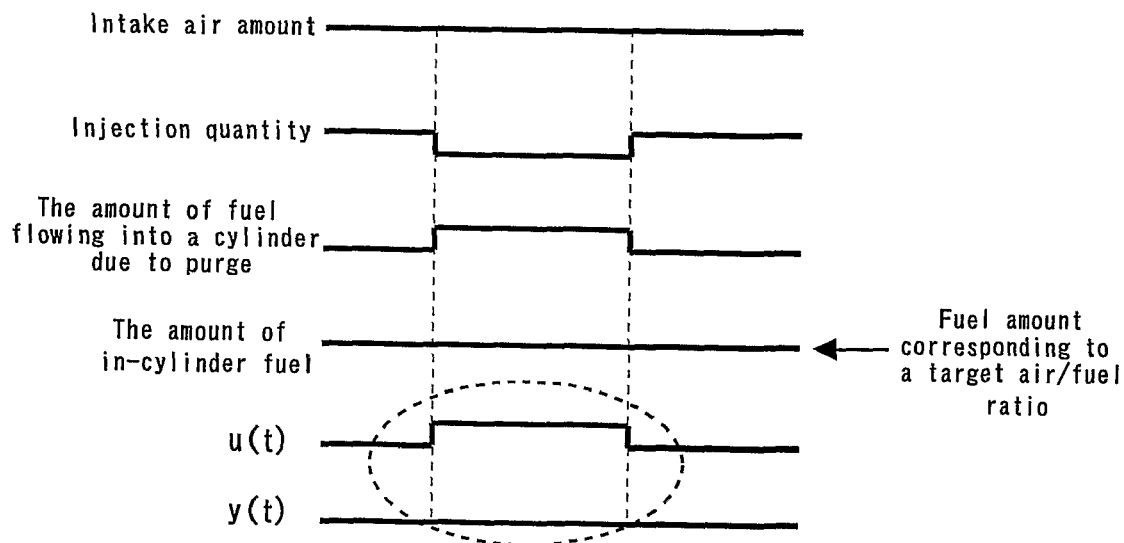
FIG. 5 is a diagram showing a comparative example for explanation of effects obtained in the second embodiment of the present invention.

FIG. 5 is a diagram showing a comparative example for explanation of effects obtained in the second embodiment. This comparative example represents a case where the input air/fuel ratio u(t) is computed from the amount of intake air based on the output from the air flow meter 5 and the amount of fuel based on the amount of injection from the injector 12.

As described above, noncoincidence between the amount of intake air and the value based on the output from the air flow meter 5 or noncoincidence between the actual amount of fuel and the injection quantity of the injector 12 occurs due to the influence of purge gas, blowby gas or the like. In such a case, there is a possibility of failure to ensure correspondence between the input air/fuel ratio u(t) and the output air/fuel ratio y(t) in an input air/fuel ratio setting method such as that in the comparative example shown in FIG. 5.

More specifically, a case can be supposed where, for example, as shown in FIG. 5, when the amount of injection from the injector 12 is reduced in a situation where the amount of intake air is constant, fuel simultaneously flows into the cylinder 2 due to purge. In such a case, the reduction in the amount of fuel on the injector 12 side and the increase in the amount of fuel flowing in due to purge cancel out and the amount of in-cylinder fuel in the cylinder 2 does not change. As a result, a situation occurs where even though the amount of injection from the injector 12 is reduced, the corresponding change does not appear in the output from the pre-catalyst sensor 17 (the sensor output does not change).

According to the input air/fuel ratio setting method in the comparative example, as shown in FIG. 5, the input air/fuel ratio u(t) also changes uniformly according to a reduction in the amount of injection from the injector 12. As a result, a state occurs where there is no change in pre-catalyst sensor 17 output even though the input air/fuel ratio u(t) is changed, as shown in FIG. 5. In such a case, there is a possibility of a characteristic of the pre-catalyst sensor 17 such as waste time or response delay being recognized (identified) as maximized.

In this respect, the method of setting the input air/fuel ratio u(t) according to the present embodiment enables identification where avoiding a state such as shown in FIG. 5.

Only a problem relating to noncoincidence in the injection quantity, i.e., a matter relating to the second feature of the second embodiment, has been described with reference to FIG. 5. However, though not shown, the same effect with respect to the amount of intake air can also be obtained in an arrangement having the first feature of the second embodiment. Also, the first feature is such that when a change in the amounts of air due to (i) to (iii) described above occurs before the intake valve closing time after fuel injection, this change appears in the input air/fuel ratio u(t). Therefore, the same advantages of increasing identification chances and so on as those of the first embodiment are obtained.

It should be noted that the computation method used when changes in the amounts of air (i) to (iii) are reflected in the amount of intake air and the computation method for reflecting changes in the amounts of fuel (iv) to (vi) in the amount of fuel injection are not limited to the computation methods of the present embodiment (i.e., simple addition and subtraction). With respect to the amount of intake air based on the air flow meter output and the injection quantity from the injector 12, computation of amounts of correction according to the amounts (i) to (vi) may be suitably performed based on the four rules of arithmetic to compute the actual in-cylinder intake air amount and the actual in-cylinder fuel amount.

In the above-described embodiment 2, the "air delivery amount detection means" and the "actual in-cylinder intake air amount computation means" in the above-described second aspect of the present invention are realized by the operation corresponding to the above-described first feature. In the second embodiment, the amounts of air (i) to (iii) in the above-described first feature correspond to "an amount of air delivered between the intake air passage and the outside downstream of the air flow meter" in the above-described second aspect of the present invention.

Also, in the second embodiment, the "in-cylinder air/fuel ratio computation means" in the above-described second aspect of the present invention is realized by computing the air/fuel ratio by utilizing the actual in-cylinder intake air amount (equation (26)). Also, in the above-described second embodiment, the technique of determining the existence/nonexistence of a sensor abnormality by comparing the parameters identified in the same manner as in the first embodiment with various determination values corresponds to the "abnormality determination means" in the above-described second aspect of the present invention and to the "parameter abnormality determination means" in the above-described third aspect of the present invention.

Also, in the second embodiment 2, the "in-cylinder fuel amount computation means" in the above-described eighth aspect of the present invention is realized by the operation corresponding to the above-described second feature.

Modified Example of the Second Embodiment

First Modified Example

The first and second features of the second embodiment may be utilized independently of each other. For example, the input air/fuel ratio u(t) may be given by the following equation (27):

$$\text{Input air/fuel ratio } u(t) = \text{actual in-cylinder intake air amount/injection quantity of injector 12} \quad (27)$$

Also, the input air/fuel ratio u(t) may be given by the following equation (28):

$$u(t) = \text{intake air amount based on output from air flow meter 5/actual in-cylinder fuel amount} \quad (28)$$

It is not necessarily required that all the amounts of air (i) to (iii) in the first feature be reflected in the actual in-cylinder intake air amount. The actual in-cylinder intake air amount may be computed by using one or two of the amounts of air (i) to (iii). The same can also said with respect to the amounts of fuel (iv) to (vi).

Second Modified Example

The second embodiment can also be used for determination of the existence/nonexistence of an abnormality in the post-catalyst sensor 18. For example, in a case where the post-catalyst sensor 18 is set as an abnormality detection object, abnormality detection may be performed by identifying various parameters corresponding to the characteristics of the post-catalyst sensor 18 as in the second modified example of the first embodiment.

Third Modified Example

The second embodiment can also be used for determination of the existence/nonexistence of an abnormality in the catalyst 11. In a case where abnormality detection is performed on the catalyst 11, parameters (k, T, L) of a numerical expression for a model of characteristics relating to the catalyst 11 are identified as in the third modified example of the first embodiment. Determination as to the existence/nonexistence of an abnormality in the catalyst 11 may be made by comparing the identified waste time L with a predetermined determination value.

In the third modified example of the second embodiment described above, the method of comparing the waste time L with a predetermined determination value corresponds to the "abnormality determination means" in the above-described fifth aspect of the present invention and to the "parameter abnormality determination means" in the above-described sixth aspect of the present invention.

Third Embodiment

A feature of the third embodiment resides in prohibiting identification in condition where the accuracy of computation of kl_IVC, the actual intake air amount or the in-cylinder fuel amount deteriorates in the above-described first and second embodiments.

More specifically, in the third embodiment, identification is prohibited in a case where purge concentration learning is undetermined, a case where any estimated value of the amount of oil-diluted fuel is undetermined, a case where the pre-catalyst sensor 17 is inactive, or a case where malfunction of the air flow meter 5 or the injector 12 is recognized. Also, identification is also prohibited in a cold state, because the accuracy with which the amount of fuel attached to the wall surface is detected deteriorates in the cold state. Such an operation can be realized by making the ECU 20 select between execution and prohibition of identification by using a technique of suitably setting a flag, a technique of grasping the temperature with a temperature sensor, or the like while grasping each of the above-described conditions.

According to the above-described third embodiment, identification can be prohibited when the accuracy with which the amount of intake air or the amount of fuel is estimated is low, thereby reducing the occurrence of identification performed with low accuracy at an unsuitable situation. While identification is inhibited in the third embodiment, the present invention is not limited to inhibition as described in the third embodiment. For example, in the above-described particular situations, identification is not stopped but the rate of identification reflection in the above-described particular situations may be reduced in comparison with the rate not in the above-described particular situations.

Fourth Embodiment

In the fourth embodiment, the amount of intake air at the time of intake valve closing (kl_IVC) is utilized for detection of an abnormality in the A/F sensor, from a different viewpoint from the concept of the first embodiment (i.e. the concept of sensor abnormality detection utilizing parameter identification). In the fourth embodiment, the injection quantity is changed by open-loop control. This causes a change of the output of an A/F sensor. In the fourth embodiment, the change of the output of the A/F sensor due to the open-loop control is evaluated for detection of the A/F sensor abnormality, and kl_IVC is utilized for this detection.

A construction of an internal combustion engine according to the fourth embodiment is shown in FIG. 1, as is the first embodiment. Also, the fourth embodiment includes various processings for computing the in-cylinder air/fuel ratio ((i) IVC time obtaining processing, (ii) estimated value one-by-one computation processing, (iii) kl_IVC computation processing, (iv) in-cylinder air/fuel ratio computation processing), as is the first embodiment.

More specifically, in the fourth embodiment, first, the injection quantity is oscillated forcibly to a lean side and to a rich side by open-loop control. Then, a change in the output from the pre-catalyst sensor 17 produced as a result of the open-loop control is obtained. On the other hand, kl_IVC computation processing is executed while the injection quantity is being changed by the open-loop control, and then a change in the in-cylinder air/fuel ratio during this time period is computed on the basis of kl_IVC. The response characteristic of the pre-catalyst sensor 17 is evaluated by utilizing: information on the change in the output from the pre-catalyst sensor 17, and information on the change in the in-cylinder air/fuel ratio. According to this technique, the in-cylinder air/fuel ratio computed with high accuracy can be utilized for evaluation of the pre-catalyst sensor 17. Therefore, it is possible to detect an abnormality in the pre-catalyst sensor 17 with high accuracy.

The technique of performing abnormality detection on the A/F sensor by changing the injection quantity by open-loop control (which technique referred to as "active control") itself is disclosed, for example, in Japanese Patent Laid-Open No. 2005-30358. The description for the active control itself will not be repeated in this specification.

In the fourth embodiment, (i) IVC time obtaining processing corresponds to the "time obtaining means" of the above-described first aspect of the present invention; (ii) estimated value one-by-one computation processing to the "estimated value computation means" of the above-described first aspect of the present invention; (iii) kl_IVC computation processing to the "estimation means" of the above-described first aspect of the present invention; and (iv) in-cylinder air/fuel ratio computation processing to "in-cylinder air/fuel ratio computation means" of the above-described first aspect of the present invention. The "abnormality determination means" of the above-described first aspect of the present invention is realized by evaluating the response characteristic of the pre-catalyst sensor 17 by utilizing information on the change in the output from the pre-catalyst sensor 17 and information on the change in the in-cylinder air/fuel ratio (through characteristic evaluation using active control).

Also in the fourth embodiment, abnormality detection on the post-catalyst sensor 18 or the catalyst 11 can be performed, as in each modified example of the first embodiment. More specifically, for example, in such a case, the output from the post-catalyst sensor 18 under active control in a state where the evaluation object is in the normal condition is measured in advance (or computed by means of a response model or the like). By comparing the actual output from the post-catalyst sensor 18 under active control to the previously measured (or computed) output, an abnormality in the evaluation object can be detected. The fourth embodiment may be combined with any of the above-described embodiments or any of the modified examples of the embodiments.

Fifth Embodiment

In the fifth embodiment, the air/fuel ratio based on the actual in-cylinder intake air amount and the actual in-cylinder fuel amount in the second embodiment is combined with active control. In this way, in the fifth embodiment, the actual in-cylinder intake air amount and the actual in-cylinder fuel amount are utilized for sensor abnormality detection from a viewpoint different from the concept of sensor abnormality detection utilizing parameter identification such as that in the second embodiment.

More specifically, with respect to a time period during which the injection quantity is changed by the open-loop control in active control, a change in the pre-catalyst sensor 17 produced as a result of changing the injection quantity is obtained. Also, a change in the input air/fuel ratio $u(t)$ in equation (26) during this active control period is computed. The response characteristic of the pre-catalyst sensor 17 is evaluated by utilizing the computed input air/fuel ratio $u(t)$ and the output from the pre-catalyst sensor 17.

Thus, abnormality in the pre-catalyst sensor 17 can be detected with high accuracy by utilizing high-accuracy air/fuel ratio information obtained on the basis of the actual in-cylinder intake air amount and the actual in-cylinder fuel amount. It should be noted that equation (27) or (28) may be used in place of equation (26) as a modified example.

In the fifth embodiment, the "in-cylinder air/fuel ratio computation means" in the above-described second aspect of the present invention is realized by computing the air/fuel ratio by utilizing the actual in-cylinder intake air amount (equation (26)), as in the second embodiment. Also, in the above-described fifth embodiment, the "abnormality determination means" in the above-described second aspect of the present invention is realized by characteristic evaluation utilizing active control.

Also in the fifth embodiment, abnormality detection on the post-catalyst sensor 18 and the catalyst 11 can be performed, as in the fourth embodiment. The fifth embodiment may also be combined with any of the above-described embodiments or any of the modified examples of the embodiments.

Sixth Embodiment

An air/fuel ratio control apparatus for an internal combustion engine according to the sixth embodiment of the present invention will be described below. In the sixth embodiment, parameters of a primary delay element are identified by using the identification method and the input air/fuel ratio setting method in the first embodiment, and the identified parameters are utilized for air/fuel ratio feedback control.

The sixth embodiment can be applied to an internal combustion engine of the construction shown in FIG. 1, as is the first embodiment. In the sixth embodiment, the ECU 20 is programmed to perform processing for identifying the parameters of the primary delay element and processing for setting the input air/fuel ratio u(t) by utilizing kl_IVC, as is that in the first embodiment. The sixth embodiment may include no processing for executing sensor characteristic abnormality determination in the first embodiment (processing of comparing the identified parameters with various abnormality determination values). In the following description, the description for the same details as those of the first embodiment will not be repeated; description will be made only of points characteristic to the sixth embodiment, i.e., points relating to air/fuel ratio control.

Figure 6:
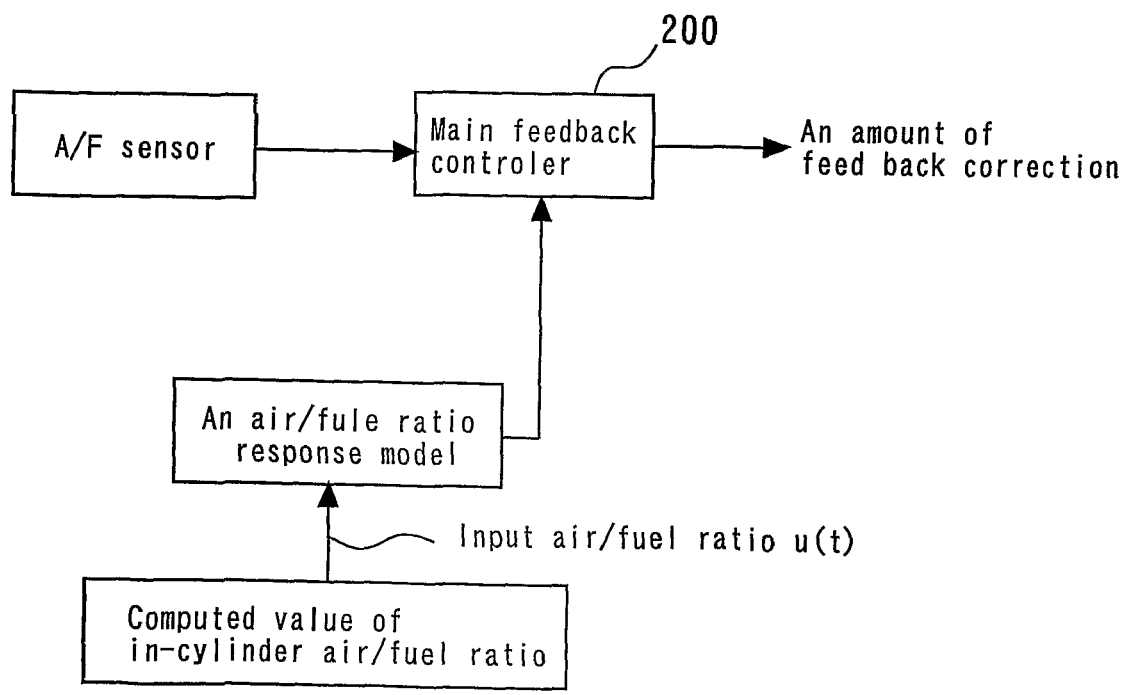
FIG. 6 is a schematic diagram of a feedback system provided in the sixth embodiment, i.e., a schematic diagram for explaining a method of computing an amount of feed back correction according to the sixth embodiment.

FIG. 6 is a schematic diagram of a feedback system provided in the sixth embodiment, i.e., a schematic diagram for explaining a method of computing an amount of feed back correction according to the sixth embodiment. As shown in FIG. 6, a computed value of the in-cylinder air/fuel ratio is input as input air/fuel ratio u(t) to an air/fuel ratio response model, and one-by-one identification is performed in the same manner as in the first embodiment.

The actual output from the pre-catalyst sensor 17 and parameters of the air/fuel ratio response model (A/F response model) are input to a main feedback controller 200. The main feedback controller 200 computes an amount of feedback correction on the basis of the input values. Feedback control is executed on the basis of the computed amount of feedback correction.

According to the above-described sixth embodiment, identification of parameters of a model is effectively performed, as in the first embodiment, and feedback control can be performed by utilizing the identified parameters. The identification restriction according to the third embodiment may be combined with the sixth embodiment.

Seventh Embodiment

As described above, in the sixth embodiment, part of the features of the first embodiment (the identification method and the input air/fuel ratio setting method) is combined with air/fuel ratio feedback control. In contrast, in the seventh embodiment, the second embodiment is combined with air/fuel ratio feedback control.

More specifically, the ECU 20 is programmed to perform processing for computing the actual in-cylinder intake air amount and the actual in-cylinder fuel amount in an internal combustion engine of the construction shown in FIG. 4, as is that in the second embodiment. The ECU 20 is also programmed to perform processing for computing the in-cylinder air/fuel ratio by using the actual in-cylinder intake air amount and the in-cylinder fuel amount (refer to equation (26)). This in-cylinder air/fuel ratio is utilized as the input air/fuel ratio u(t) of the air/fuel ratio response model of the feedback control system shown in FIG. 6.

In this way, identification of the parameters of the model can be effectively performed, as in the second embodiment, and feedback control can be effectively performed by utilizing the identified parameters. The identification restriction according to the third embodiment may be combined with the seventh embodiment.

Each of the first to seventh embodiments has been described by assuming a port-injection-type internal combustion engine. However, the present invention can also be applied to a direct-injection-type internal combustion engine and to an internal combustion engine using both port injection and direct injection, because the effects of the present invention can be exerted regardless of the structure of the internal combustion engine in a situation where a difference (irregularities in air fuel ratio) occurs between an air/fuel ratio initially predicted at a fuel injection time and an air/fuel ratio actually determined at the time of intake valve closing.

However, in the port-injection-type internal combustion engine, there is a need to inject fuel before closing of the intake valve. Hence, the demand for measures to cope with the above-described irregularities in air/fuel ratio with respect to a port-injection-type internal combustion engine is thought to be stronger than that with respect to a direct-injection-type internal combustion engine. Therefore the first to seventh embodiments have particularly advantageous effects in port-injection-type internal combustion engines.

Internal combustion engines to which apparatuses according to the first to seventh embodiments can be applied are not limited to the constructions shown in FIGS. 1 and 4. For example, the embodiments may be applied to an internal combustion engine having only the upstream-side catalyst 11. Also, the number of cylinders is not restrictedly specified. The concept of the present embodiment can also be utilized for a multicylinder internal combustion engine by computing the in-cylinder air/fuel ratio on a cylinder-by-cylinder basis.

As described above, the second feature (computation of the actual in-cylinder fuel amount) of the second embodiment is based on a concept different from the first feature (computation of the actual intake air amount) of the second embodiment. Therefore, the second feature (computation of the actual in-cylinder fuel amount) can be used separately from the first feature, i.e. the second feature can be combined independently with each of the above-described embodiment.

The invention claimed is:

1. An abnormality detection device for an internal combustion engine, comprising:
    output obtaining means for obtaining an output from an exhaust gas sensor provided in an internal combustion engine;
    estimated value computation means for repeatedly computing estimated values of an amount of intake air in a predetermined cycle with respect to each of cylinders of the internal combustion engine;
    time obtaining means for obtaining valve closing time at which an intake valve of one cylinder of the cylinders of the internal combustion engine is closed after an intake stroke in one combustion cycle with respect to the one cylinder of the internal combustion engine;
    estimation means for performing estimation of the amount of intake air in the one cylinder at the valve closing time in present combustion cycle based on (a), (b), (c) and (d);
    (a) at least one of estimated values computed before the valve closing time in the present combustion cycle in a plurality of estimated values computed by the estimated value computation means about the valve closing time in the present combustion cycle of the one cylinder, (b) at least one of the estimated values computed after the valve closing time in the present combustion cycle in a plurality of estimated values computed by the estimated value computation means about the valve closing time in the present combustion cycle of the one cylinder, (c) the time period from the time at which the at least one estimated value computed before the valve closing time in the present combustion cycle is computed to the valve closing time in the present combustion cycle, (d) the time period from the valve closing time in the present combustion cycle to the time at which the at least one estimated value computed after the valve closing time in the present combustion cycle is computed;

in-cylinder air/fuel ratio computation means for computing the air/fuel ratio of the one cylinder of the internal combustion engine based on the estimated value of the amount of intake air obtained by the estimation means with respect to the one cylinder in the present combustion cycle and an amount of fuel supply to the one cylinder in the present combustion cycle; and abnormality determination means of determining existence-or-nonexistence of an abnormality in the exhaust gas sensor based on the output from the exhaust gas sensor obtained by the output obtaining means and the air/fuel ratio computed by the in-cylinder air/fuel ratio computation means, wherein the abnormality determination means includes:

identification means for forming a model of a system from the one cylinder to the exhaust gas sensor by a primary delay element and identifying a parameter in the primary delay element; and parameter abnormality determination means for determining the existence-or-nonexistence of an abnormality in the exhaust gas sensor based on the parameter identified by the identification means; and said identification means including, means for obtaining an input air/fuel ratio by using the air/fuel ratio computed by the in-cylinder air/fuel ratio computation means, during a target air/fuel ratio of the internal combustion engine being controlled so that the target air/fuel ratio being a particular value, upon the air/fuel ratio computed by the in-cylinder air/fuel ratio computation means including a change different from the target air/fuel ratio, the change being used as an actual in-cylinder air/fuel ratio of the internal combustion engine, means for obtaining an output air/fuel ratio based on the output from the exhaust gas sensor, and means for identifying the parameter in the primary delay element based on the input air/fuel ratio including the change different from the target air/fuel ratio and the output air/fuel ratio based on the output corresponding to the change from the exhaust gas sensor.

2. An abnormality detection device for an internal combustion engine, comprising:

output obtaining means for obtaining an output from an exhaust gas sensor provided downstream of a catalyst in an internal combustion engine;

estimated value computation means for repeatedly computing estimated values of an amount of intake air in a predetermined cycle with respect to each of cylinders of the internal combustion engine;

time obtaining means for obtaining valve closing time at which an intake valve of one of the cylinders of the internal combustion engine is closed after an intake stroke in one combustion cycle with respect to the one cylinder of the internal combustion engine;

estimation means of performing estimation of the amount of intake air in the one cylinder at the valve closing time in the present combustion cycle based on (a), (b), (c) and (d);

(a) at least one of estimated values computed before the valve closing time in the present combustion cycle in a plurality of estimated values computed by the estimated value computation means about the valve closing time in the present combustion cycle of the one cylinder, (b) at least one of the estimated values computed after the valve closing time in the present combustion cycle in a plurality of estimated values computed by the estimated value computation means about the valve closing time in the present combustion cycle of the one cylinder, (c) the time period from the time at which the at least one estimated value computed before the valve closing time in the present combustion cycle is computed to the valve closing time in the present combustion cycle, (d) the time period from the valve closing time in the present combustion cycle to the time at which the at least one estimated value computed after the valve closing time in the present combustion cycle is computed;

in-cylinder air/fuel ratio computation means for computing the air/fuel ratio of the one cylinder of the internal combustion engine based on the estimated value of the amount of intake air obtained with respect to the one cylinder in the present combustion cycle by the estimation means and an amount of fuel supplied to the one cylinder in the present combustion cycle; and abnormality determination means for determining existence-or-nonexistence of an abnormality in the catalyst on the basis of the output from the exhaust gas sensor obtained by the output obtaining means and the air/fuel ratio computed by the in-cylinder air/fuel ratio computation means, wherein the abnormality determination means includes:

identification means for forming a model of a system from the one cylinder to the exhaust gas sensor by a primary delay element and identifying a parameter in the primary delay element; and parameter abnormality determination means for determining the existence-or-nonexistence of an abnormality in the catalyst based on the parameter identified by the identification means; and said identification means including, means for obtaining an input air/fuel ratio by using the air/fuel ratio computed by the in-cylinder air/fuel ratio computation means, during a target air/fuel ratio of the internal combustion engine being controlled so that the target air/fuel ratio being a particular value, upon the air/fuel ratio computed by the in-cylinder air/fuel ratio computation means including a change different from the target air/fuel ratio, the change being used as an actual in-cylinder air/fuel ratio of the internal combustion engine, means for obtaining an output air/fuel ratio based on the output from the exhaust gas sensor, and means for identifying the parameter in the primary delay element based on the input air/fuel ratio including the change different from the target air/fuel ratio and the output air/fuel ratio based on the output corresponding to the change from the exhaust gas sensor.

3. The abnormality detection device for an internal combustion engine according to claim 1, further comprising:
identification restriction means for inhibiting identification by the identification means or reducing the rate of reflection of identification by the identification means when the internal combustion engine is in a predetermined operating condition in which the accuracy of the result of computation by the in-cylinder air/fuel ratio computation means is reduced.

4. The abnormality detection device for an internal combustion engine according to claim 1, further comprising:
in-cylinder fuel amount computation means for computing the amount of fuel supply to the one cylinder on the basis of an amount of injection from a fuel injection valve of the internal combustion engine and an operating condition of the internal combustion engine.

5. An abnormality detection device for an internal combustion engine, comprising:
an output obtaining unit that obtains an output from an exhaust gas sensor provided in an internal combustion engine;
an estimated value computation unit that repeatedly computes estimated values of an amount of intake air in a predetermined cycle with respect to each of cylinders of the internal combustion engine;
a time obtaining unit that obtains valve closing time at which an intake valve of one cylinder of the cylinders of the internal combustion engine is closed after an intake stroke in one combustion cycle with respect to the one cylinder of the internal combustion engine;
an estimation unit that performs estimation of the amount of intake air in the one cylinder at the valve closing time in present combustion cycle based on (a), (b), (c) and (d);
(a) at least one of estimated values computed before the valve closing time in the present combustion cycle in a plurality of estimated values computed by the estimated value computation unit about the valve closing time in the present combustion cycle of the one cylinder,
(b) at least one of the estimated values computed after the valve closing time in the present combustion cycle in a plurality of estimated values computed by the estimated value computation unit about the valve closing time in the present combustion cycle of the one cylinder,
(c) the time period from the time at which the at least one estimated value computed before the valve closing time in the present combustion cycle is computed to the valve closing time in the present combustion cycle,
(d) the time period from the valve closing time in the present combustion cycle to the time at which the at least one estimated value computed after the valve closing time in the present combustion cycle is computed;
an in-cylinder air/fuel ratio computation unit that computes the air/fuel ratio of the one cylinder of the internal combustion engine based on the estimated value of the amount of intake air obtained by the estimation unit with respect to the one cylinder in the present combustion cycle and an amount of fuel supply to the one cylinder in the present combustion cycle; and
an abnormality determination unit that determines existence-or-nonexistence of an abnormality in the exhaust gas sensor based on the output from the exhaust gas sensor obtained by the output obtaining unit and the air/fuel ratio computed by the in-cylinder air/fuel ratio computation unit, wherein
the abnormality determination means includes:
an identification unit that forms a model of a system from the one cylinder to the exhaust gas sensor by a primary delay element and identifying a parameter in the primary delay element; and
a parameter abnormality determination unit that determines the existence-or-nonexistence of an abnormality in the exhaust gas sensor based on the parameter identified by the identification means; and
said identification unit including,
a unit that obtains an input air/fuel ratio by using the air/fuel ratio computed by the in-cylinder air/fuel ratio computation unit, during a target air/fuel ratio of the internal combustion engine being controlled so that the target air/fuel ratio being a particular value, upon the air/fuel ratio computed by the in-cylinder air/fuel ratio computation unit including a change different from the target air/fuel ratio, the change being used as an actual in-cylinder air/fuel ratio of the internal combustion engine,
a unit that obtains an output air/fuel ratio based on the output from the exhaust gas sensor, and
a unit that identifies the parameter in the primary delay element based on the input air/fuel ratio including the change different from the target air/fuel ratio and the output air/fuel ratio based on the output corresponding to the change from the exhaust gas sensor.

6. An abnormality detection device for an internal combustion engine, comprising:
an output obtaining unit that obtains an output from an exhaust gas sensor provided downstream of a catalyst in an internal combustion engine;
an estimated value computation unit that repeatedly computes estimated values of an amount of intake air in a predetermined cycle with respect to each of cylinders of the internal combustion engine;
a time obtaining unit that obtains valve closing time at which an intake valve of one of the cylinders of the internal combustion engine is closed after an intake stroke in one combustion cycle with respect to the one cylinder of the internal combustion engine;
an estimation unit that performs estimation of the amount of intake air in the one cylinder at the valve closing time in the present combustion cycle based on (a), (b), (c) and (d);
(a) at least one of estimated values computed before the valve closing time in the present combustion cycle in a plurality of estimated values computed by the estimated value computation unit about the valve closing time in the present combustion cycle of the one cylinder,
(b) at least one of the estimated values computed after the valve closing time in the present combustion cycle in a plurality of estimated values computed by the estimated value computation unit about the valve closing time in the present combustion cycle of the one cylinder,
(c) the time period from the time at which the at least one estimated value computed before the valve closing time in the present combustion cycle is computed to the valve closing time in the present combustion cycle,
(d) the time period from the valve closing time in the present combustion cycle to the time at which the at least one estimated value computed after the valve closing time in the present combustion cycle is computed;
an in-cylinder air/fuel ratio computation unit that computes the air/fuel ratio of the one cylinder of the internal combustion engine based on the estimated value of the amount of intake air obtained with respect to the one cylinder in the present combustion cycle by the estimation unit and an amount of fuel supplied to the one cylinder in the present combustion cycle; and an abnormality determination unit that determines existence-or-nonexistence of an abnormality in the catalyst based on the output from the exhaust gas sensor obtained by the output obtaining unit and the air/fuel ratio computed by the in-cylinder air/fuel ratio computation unit, wherein the abnormality determination means includes:

an identification unit that forms a model of a system from the one cylinder to the exhaust gas sensor by a primary delay element and identifying a parameter in the primary delay element; and a parameter abnormality determination unit that determines the existence-or-nonexistence of an abnormality in the catalyst based on the parameter identified by the identification means; and said identification unit including, a unit that obtains n input air/fuel ratio by using the air/fuel ratio computed by the in-cylinder air/fuel ratio computation unit, during a target air/fuel ratio of the internal combustion engine being controlled so that the target air/fuel ratio being a particular value, upon the air/fuel ratio computed by the in-cylinder air/fuel ratio computation unit including a change different from the target air/fuel ratio, the change being used as an actual in-cylinder air/fuel ratio of the internal combustion engine, a unit that obtains an output air/fuel ratio based on the output from the exhaust gas sensor, and a unit that identifies the parameter in the primary delay element based on the input air/fuel ratio including the change different from the target air/fuel ratio and the output air/fuel ratio based on the output corresponding to the change from the exhaust gas sensor.

* * * * *